US008973005B2

(12) United States Patent  
Sonoda et al.

(10) Patent No.: US 8,973,005 B2  
(45) Date of Patent: Mar. 3, 2015

(54) INFORMATION PROCESSING APPARATUS, INFORMATION PROCESSING METHOD, RECORDING MEDIUM AND INFORMATION PROCESSING SYSTEM

(75) Inventors: Shuhei Sonoda, Kanagawa (JP); Masayuki Takada, Tokyo (JP); Eiji Miyakawa, Tokyo (JP); Hiroshi Nakayama, Chiba (JP); Tsutomu Kawachi, Tokyo (JP)

(73) Assignee: Sony Corporation, Tokyo (JP)

( * ) Notice: Subject to any disclaimer, the term of this patent is extended or adjusted under 35 U.S.C. 154(b) by 239 days.

(21) Appl. No.: 13/603,762

(22) Filed: Sep. 5, 2012

(65) Prior Publication Data

US 2013/0067484 A1   Mar. 14, 2013

(30) Foreign Application Priority Data

Sep. 12, 2011   (JP) .................................. 2011-197974

(51) Int. Cl.
   *G06F 9/48*   (2006.01)
   *G06F 9/40*   (2006.01)
   *H04W 36/00*  (2009.01)
   *G06F 9/50*   (2006.01)

(52) U.S. Cl.
   CPC ............ *G06F 9/4881* (2013.01); *G06F 9/4843* (2013.01); *H04W 36/00* (2013.01); *G06F 9/5038* (2013.01); *G06F 9/505* (2013.01); *G06F 2209/5021* (2013.01)

USPC ............ 718/102; 718/104; 718/105; 370/331

(58) Field of Classification Search
   None
   See application file for complete search history.

(56) References Cited

U.S. PATENT DOCUMENTS

| 2008/0080425 | A1* | 4/2008 | Lee et al. ....................... 370/331 |
| 2008/0112364 | A1* | 5/2008 | Kwon et al. ................... 370/331 |
| 2010/0329212 | A1* | 12/2010 | Jeon et al. ..................... 370/331 |

FOREIGN PATENT DOCUMENTS

JP   2007-199869 A   9/2007

* cited by examiner

*Primary Examiner* — Qing Wu  
(74) *Attorney, Agent, or Firm* — Wolf, Greenfield & Sacks, P.C.

(57) ABSTRACT

There is provided an information processing apparatus including a receiver configured to receive a request to perform processing related to a task, from a first information processing apparatus which functions as a client on a network; a scheduler configured to, when a rank of a priority of the scheduler of the information processing apparatus among information processing apparatuses on the network is a first predetermined rank or higher, assign the task to one or a plurality of second information processing apparatuses which function as nodes on the network; and a transmitter configured to transmit a request to execute processing related to the task assigned to the one or the plurality of second information processing apparatuses.

19 Claims, 16 Drawing Sheets

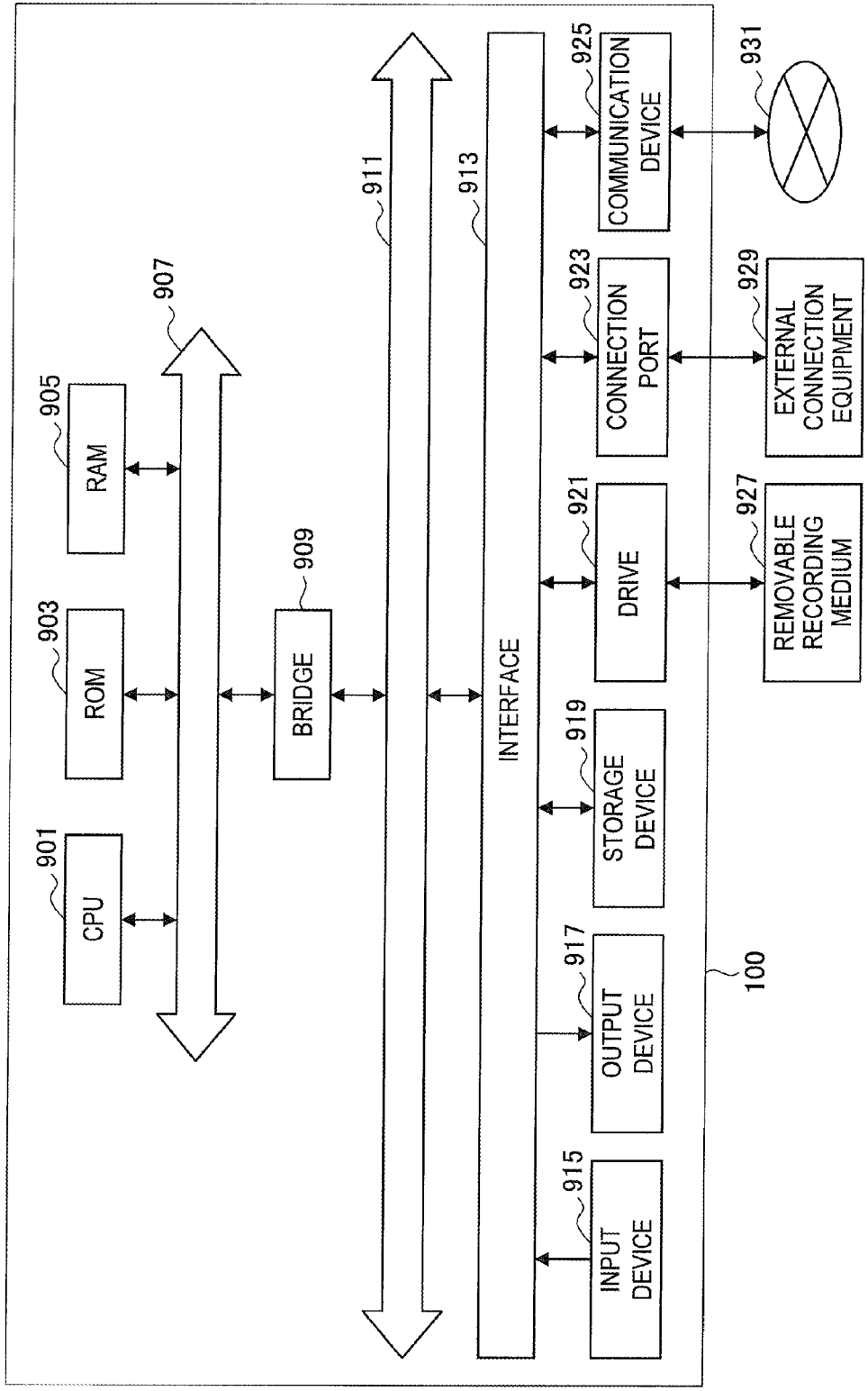

INFORMATION PROCESSING APPARATUS, INFORMATION PROCESSING METHOD, RECORDING MEDIUM AND INFORMATION PROCESSING SYSTEM

BACKGROUND

The present disclosure relates to an information processing apparatus, an information processing method, a recording medium and an information processing system.

As related art, a technique is known of connecting a device such as a home appliance having a microcontroller to a computer through a network and operating the device and the computer in cooperation. For example, the following Japanese Patent Application Laid-Open No. 2007-199869 discloses a technique where a computer assigns a program divided for a series of operations according to a function of each device, and further determines communication process between devices.

SUMMARY

In recent years, devices are having higher functions. For example, televisions or game machines having higher image processing capacity are spreading. Further, accompanying spread of smartphones and tablet PCs (Personal Computers), more users also have generally a plurality of information processing terminals. Although these devices each have high information processing capacity, functions provided to users are highly developed, and therefore a single device may not necessarily secure sufficient service quality.

According to the present disclosure, there is provided a new and improved information processing apparatus, an information processing system, an information processing method and a recording medium which can improve quality of service provided to users effectively using devices connected to a network.

According to an embodiment of the present disclosure, there is provided an information processing apparatus including a receiver configured to receive a request to perform processing related to a task, from a first information processing apparatus which functions as a client on a network, a scheduler configured to, when a rank of a priority of the scheduler of the information processing apparatus among information processing apparatuses on the network is a first predetermined rank or higher, assign the task to one or a plurality of second information processing apparatuses which function as nodes on the network, and a transmitter configured to transmit a request to execute processing related to the task assigned to the one or the plurality of second information processing apparatuses.

According to an another embodiment of the present disclosure, there is provided an information processing method including receiving a request to perform processing related to a task, from a first information processing apparatus which functions as a client on a network, when a rank of a priority of the scheduler of the information processing apparatus among information processing apparatuses on the network is a first predetermined rank or higher, assigning the task to one or a plurality of second information processing apparatuses which function as nodes on the network, and transmitting a request to execute processing related to the task assigned to the one or the plurality of second information processing apparatuses.

Further, according to yet another embodiment of the present disclosure, there is provided a computer-readable recording medium having a program recorded thereon which causes a computer to execute a function of receiving a request to perform processing related to a task, from a first information processing apparatus which functions as a client on a network, a function of, when a rank of a priority of the scheduler of the information processing apparatus among information processing apparatuses on the network is a first predetermined rank or higher, assigning the task to one or a plurality of second information processing apparatuses which function as nodes on the network, and a function of transmitting a request to execute processing related to the task assigned to the one or the plurality of second information processing apparatuses.

Further, according to yet another embodiment of the present disclosure, there is provided an information processing system including a plurality of information processing apparatuses on a network which each include a receiver configured to receive a request to perform processing related to a task, from a first information processing apparatus which functions as a client on a network, a scheduler configured to assign the task to one or a plurality of second information processing apparatuses which function as nodes on the network, and a transmitter configured to transmit a request to execute processing related to the task assigned to the one or the plurality of second information processing apparatuses. A function of a scheduler of, among the plurality of information processing apparatuses, an information processing apparatus whose rank of a priority of the scheduler is a first predetermined rank or higher is enabled, and functions of schedulers of the rest of information processing apparatuses are disabled According to the present disclosure, an information processing apparatus which is more suitable as a scheduler is used as a scheduler which performs assignment processing in order to assign processing of a task requested by a given device (client) on a network to another device (node) on the network. Further, even when the information processing apparatus is not temporarily used as a scheduler, the information processing apparatus can potentially function as a potential scheduler, so that it is possible to continue processing using another information processing apparatus as a scheduler even when, for example, the information processing apparatus which functions as the scheduler no longer fulfills the function. Consequently, it is possible to efficiently and stably execute task distribution processing.

As described above, according to the present disclosure, it is possible to improve quality of service provided to users effectively using devices connected to a network.

BRIEF DESCRIPTION OF THE DRAWINGS

FIG. 16 is a block diagram illustrating a hardware configuration of an information processing apparatus according to the embodiment of the present disclosure.

DETAILED DESCRIPTION OF THE EMBODIMENTS

Figure 1:
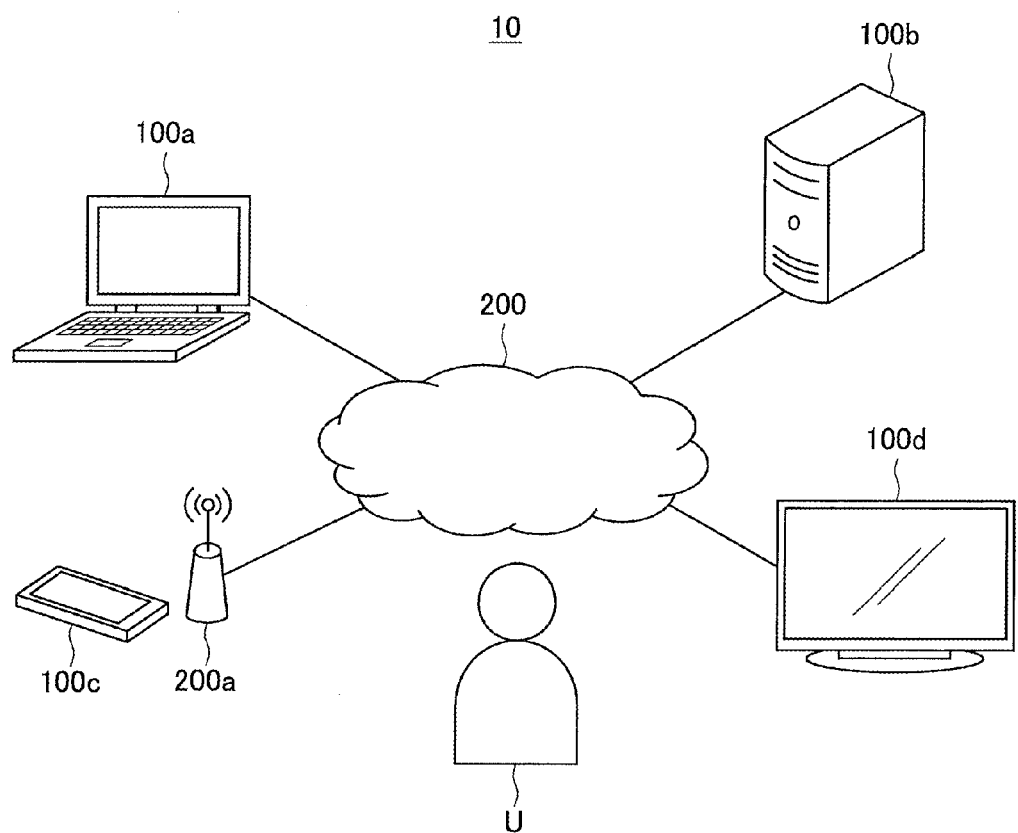
FIG. 1 is a view illustrating an example of an information processing system according to an embodiment of the present disclosure.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be provided in the order shown below:
1. System Configuration
2. Task Processing Sequence
3. Scheduler Management
4. Other
5. Example of Function to be implemented
6. Hardware Configuration
7. Supplement (1. System Configuration)

FIG. 1 is a view illustrating an example of an information processing system according to an embodiment of the present disclosure. Referring to FIG. 1, with an information processing system 10, a plurality of information processing apparatuses 100 are connected with each other through a network 200. With an illustrated example, the information processing apparatus 100 has a PC (Personal Computer) 100a, a server 100b, a mobile terminal 100c and a television 100d. In addition, the embodiment of the present disclosure described below is applied irrespectively of the type and the number of the information processing apparatuses 100, and the information processing apparatus 100 illustrated in FIG. 1 is only an example. The network 200 is one of various networks connected irrespectively of wires and wireless, and, for example, a base station 200a for connecting to mobile terminals may be included therein.

Meanwhile, a plurality of information processing apparatuses 100 configure a logical topology based on predetermined conditions. With the illustrated example, the information processing apparatus 100 configures a logical topology based on conditions that the information processing apparatus 100 is a device held by a user U. In addition, the device held by the user U does not necessarily mean a device which the user U physically has, and means a device which the user U can use. Hence, the television 100d is shared by the user U and the family, and the server 100b provides service for which the user U is registered to use.

Figure 2:
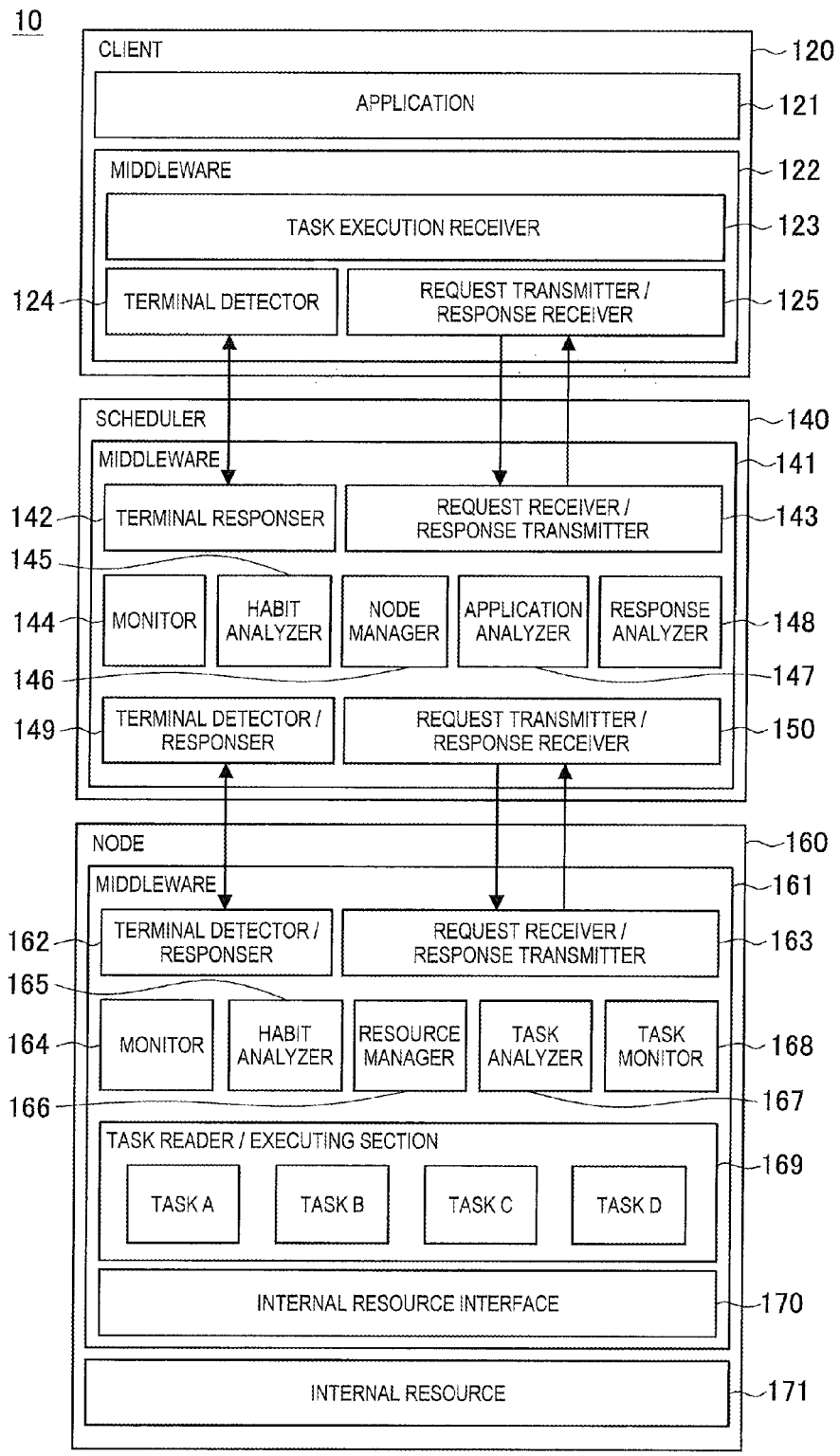
FIG. 2 is a view illustrating a schematic function configuration of the information processing system according to the embodiment of the present disclosure.

FIG. 2 is a view illustrating a schematic function configuration of the information processing system according to the embodiment of the present disclosure. Referring to FIG. 2, the information processing system 10 includes a client 120, a scheduler 140 and a node 160 as functions. The information processing apparatus 100 illustrated in FIG. 1 has at least one of these functions. That is, the information processing apparatus 100 included in the information processing system 10 is the client 120, the scheduler 140 or the node 160, or fulfills two or more functions of the client 120, the scheduler 140 or the node 160.

The above functions are implemented by, for example, middlewares installed in each information processing apparatus 100. These are illustrated as middlewares 122, 141 and 161. This middleware may be installed in each information processing apparatus 100, or may be installed in one of the information processing apparatuses 100 and loaded to another information processing apparatus 100 through the network 200. As described below, which one of functions of the client 120, the scheduler 140 and the node 160 each information processing apparatus 100 implements changes depending on a situation. Hence, the middleware installed in each information processing apparatus 100 may be shared between the above functions.

With this information processing system 10, the client 120 receives an application or task execution request from a user. Prior to this execution request or according to this execution request, the client 120 requests the scheduler 140 to load the application and execute a task according to the execution request. The scheduler 140 makes the node 160 to load a task configuring an application according to the request, and further execute the task.

In addition, there are a plurality of clients 120, schedulers 140 and nodes 160 in the information processing system 10. When there are a plurality of clients 120, the scheduler 140 processes in parallel the application or task execution request from each client 120. When there are a plurality of nodes 160, the scheduler 140 distributes tasks according to capacity of each node 160. When there are a plurality of schedulers 140, each scheduler 140 implements the function of one scheduler 140 in collaboration.

Hereinafter, function configurations of the client 120, the scheduler 140 and the node 160 will be described in details. In addition, each function is implemented using the hardware configuration of the information processing apparatus 100 described below.

(Client)

The client 120 includes an application 121 and the middleware 122. The middleware 122 includes a task execution request receiver 123, a terminal detector 124 and a request transmitter/response receiver 125.

The execution request receiver 123 receives a task execution request from the user. Meanwhile, a task for which execution is requested may be the application 121 installed in the client 120, or may be other tasks.

The request transmitter/response receiver 125 transmits an application loading request and a task execution request to the scheduler 140. Meanwhile, although the task execution request is transmitted according to the execution request of the user received by the task execution request receiver 123, the application loading request may be transmitted prior to the execution request of the user. The scheduler 140 which is the transmission destination is detected in advance by the terminal detector 124, and information about the scheduler 140 is held as a list. In addition, as described below, the task execution request may be transmitted to the node 160 instead of the scheduler 140.

Further, the request transmitter/response receiver 125 receives a response to the application loading request or the task execution request, from the scheduler 140 or the node 160. In addition, as described below, an equivalent function can be implemented using a configuration where the middleware 122 is not implemented in the client 120. That is, the middleware 122 may not necessarily be implemented in the client 120.

(Scheduler)

The scheduler 140 includes the middleware 141, and the middleware 141 includes a terminal responser 142, a request receiver/response transmitter 143, a monitor 144, a habit analyzer 145, a node manager 146, an application analyzer 147, a response analyzer 148, a terminal detector/responser 149 and a request transmitter/response receiver 150.

The terminal responser 142 notifies the presence of the scheduler 140 in response to detection of the scheduler by the terminal detector 124 of the client 120. The request receiver/response transmitter 143 receives the application loading request and the task execution request from the client 120, and transmits responses to these requests to the client 120.

The monitor 144 monitors information about the information processing apparatus 100 which functions as the scheduler 140. The information acquired by the monitor 144 includes, for example, specification information (such as processing capacity of a CPU (Central Processing Unit), memory capacity, the maximum line speed, storage capacity and battery capacity) and presence information (such as CPU utilization, a remaining memory, the current line speed, remaining storage and remaining battery). As described below, the node 160 also has the same monitor 164.

The habit analyzer 145 analyzes a log of presence information which changes from time to time among information acquired by the monitor 144, and acquires information about a habitual use state of the information processing apparatus 100 (as to whether the power source is frequently cut, is continuously in a stand-by state, or continuously goes online and in which time zone the CPU utilization is high) which functions as the scheduler 140. As described below, the node 160 also has the same habit analyzer 165.

The node manager 146 acquires and holds information such as the specification information acquired by the node 160 and the presence information (acquired by the monitor 164), information about the habitual use state (acquired by the habit analyzer 165), information about holding resources (acquired by a resource manager 166 described below), information about the task loaded to the node 160 and information about the task use state (acquired by a task monitor 168 described below). These pieces of information are acquired when, for example, the terminal detector/responser 149 detects the node 160, and are updated when the request transmitter/response receiver 150 receives a response from the node 160 and notification about a node state change from the node 160. The node manager 146 may command the task reader/executing section 169 of the node 160 to unload the loaded task based on, for example, information about the task use state.

When receiving the application loading request from the client 120, the application analyzer 147 dissolves an application into a plurality of tasks based on information related to the application (an application manifest described below) and information held by the node manager 146, and assigns each task to the appropriate node 160 and make the node 160 load the task. Meanwhile, the application analyzer 147 determines the node 160 to which each task is assigned, based on a program which is necessary for each task and information execution environment which is necessary to meet predetermined service indices. Meanwhile, the predetermined service indices are KPIs (Key Performance Indicator) such as high efficiency, a high-speed response to a client, low cost, low power consumption, high availability and high quality, and is set in advance per application and is set by the user. Meanwhile, the application analyzer 147 dynamically changes assignment of a task to each node 160 according to current processing capacity based on, for example, presence information of the node 160 and a predicted value of future processing capacity based on information about the habitual use state.

When receiving responses of processing results to the task loading request and the task execution result from the node 160, the response analyzer 148 analyzes the responses and executes the appropriate processing. When, for example, receiving a response showing that an error occurs during loading of the task or execution of the task from the node 160, the response analyzer 148 requests the application analyzer 147 to reselect a node, and retransmit a loading request or an execution request. Further, even when the response to loading of the task or execution of the task is not acquired within a predetermined time, the response analyzer 148 may decide that processing capacity decreases due to an occurrence of a problem in the node 160 and execution of another processing, and request the application analyzer 147 to reselect a node, and retransmit the loading request or the execution request.

Prior to processing in each section, the terminal detector/responser 149 detects another scheduler 140 and the node 160 included in the information processing system 10, and holds this information as a list. Further, the terminal detector/responser 149 notifies the presence of the scheduler 140 in response to detection of a scheduler by the terminal detector/responser 149 of another scheduler 140 and the terminal detector/responser 162 of the node 160.

The request transmitter/response receiver 150 transmits the task loading request and the task execution request to the node 160 according to the analysis result of the application analyzer 147. Further, the request transmitter/response receiver 150 receives the responses to these requests from the node 160. In addition, although an example has been described with the above example where the middleware 122 is implemented in the client 120, a configuration without a middleware may be employed. For example, it is possible to implement a commercially available browser in the client 120, and implement the equivalent function. More specifically, the browser of the client 120 may also be configured to specify an IP address (a host name may also be used) of the scheduler 140 as a URL, and hand over content of a task to be executed as a parameter to the scheduler 140. In this case, the request receiver/response transmitter 143 is provided with a function of an HTTP server.

(Node)

The node 160 includes the middleware 161 and an internal resource 171. The middleware 161 includes the terminal detector/responser 162, a request receiver/response transmitter 163, the monitor 164, the habit analyzer 165, the resource manager 166, the task analyzer 167, the task monitor 168 and the task reader/executing section 169.

Prior to processing in each section, the terminal detector/responser 162 detects the scheduler 140 included in the information processing system 10, and holds this information as a list. Further, the terminal detector/responser 162 notifies the presence of the node 160 in response to detection by the terminal detector/responser 149 of the scheduler 140. The request receiver/response transmitter 163 receives the task loading request and the task execution request from the scheduler 140 or the client 120, and transmits responses to these requests to the scheduler 140 or the client 120.

The monitor 164 and the habit analyzer 165 have the same functions as the monitor 144 and the habit analyzer 145 of the scheduler 140 as described above. The monitor 164 and the habit analyzer 165 provide the acquired information to the scheduler 140 through the request receiver/response transmitter 163. Meanwhile, the monitor 164 may set a threshold in advance to, for example, a value of presence information (such as the CPU utilization, the remaining memory, the current line speed, the remaining storage and the remaining battery), and may transmit a notification about a node state change to the scheduler 140 through the request receiver/response transmitter 163 when each value exceeds or goes below the threshold.

The resource manager 166 acquires and holds information about the internal resource 171 held by the node 160. The internal resource 171 is, for example, information about, for example, hardware, software and data of the information processing apparatus 100 which functions as the node 160. The resource manager 166 provides the acquired information to the scheduler 140 through the request receiver/response transmitter 163.

When receiving the task loading request from the scheduler 140, the task analyzer 167 loads a program which is necessary to execute a task, to the task reader/executing section 169 based on, for example, information related to the task (a task manifest described below). Meanwhile, the program is loaded from the scheduler 140 or another information processing apparatus 100.

The task monitor 168 monitors information about a use situation of the task loaded to the node 160 (such as the CPU utilization of each task, the memory utilization, the number of times of execution of the task or the number of accesses in unit times). The task monitor 168 provides the acquired information to the scheduler 140 through the request receiver/response transmitter 163. The task monitor 168 sets a threshold to, for example, a use frequency of the task in advance, and provides information showing that the use frequency exceeds or goes below the threshold, to the scheduler 140. Further, the task monitor 168 may command the task reader/executing section 169 to unload the loaded task based on this information.

The task reader/executing section 169 loads and executes the task utilizing the internal resource 171 through an internal resource interface 170 where necessary. As described above, the task reader/executing section 169 loads a program which is necessary to execute the task, according to an analysis result of the task analyzer 167. Further, the task reader/executing section 169 holds loaded tasks in parallel as illustrated as a task A to a task D. When, for example, the use frequency is low, these tasks are unloaded according to a command from the node manager 146 of the scheduler 140 which acquires information from the task monitor 168 or the task monitor 168. The unloaded tasks may be stored and read when the tasks become necessary again. Further, the unloaded tasks may be discarded when the storage capacity is short, and loaded from an outside when the tasks become necessary again.

(2. Task Processing Sequence)
(Loading)

Figure 3:
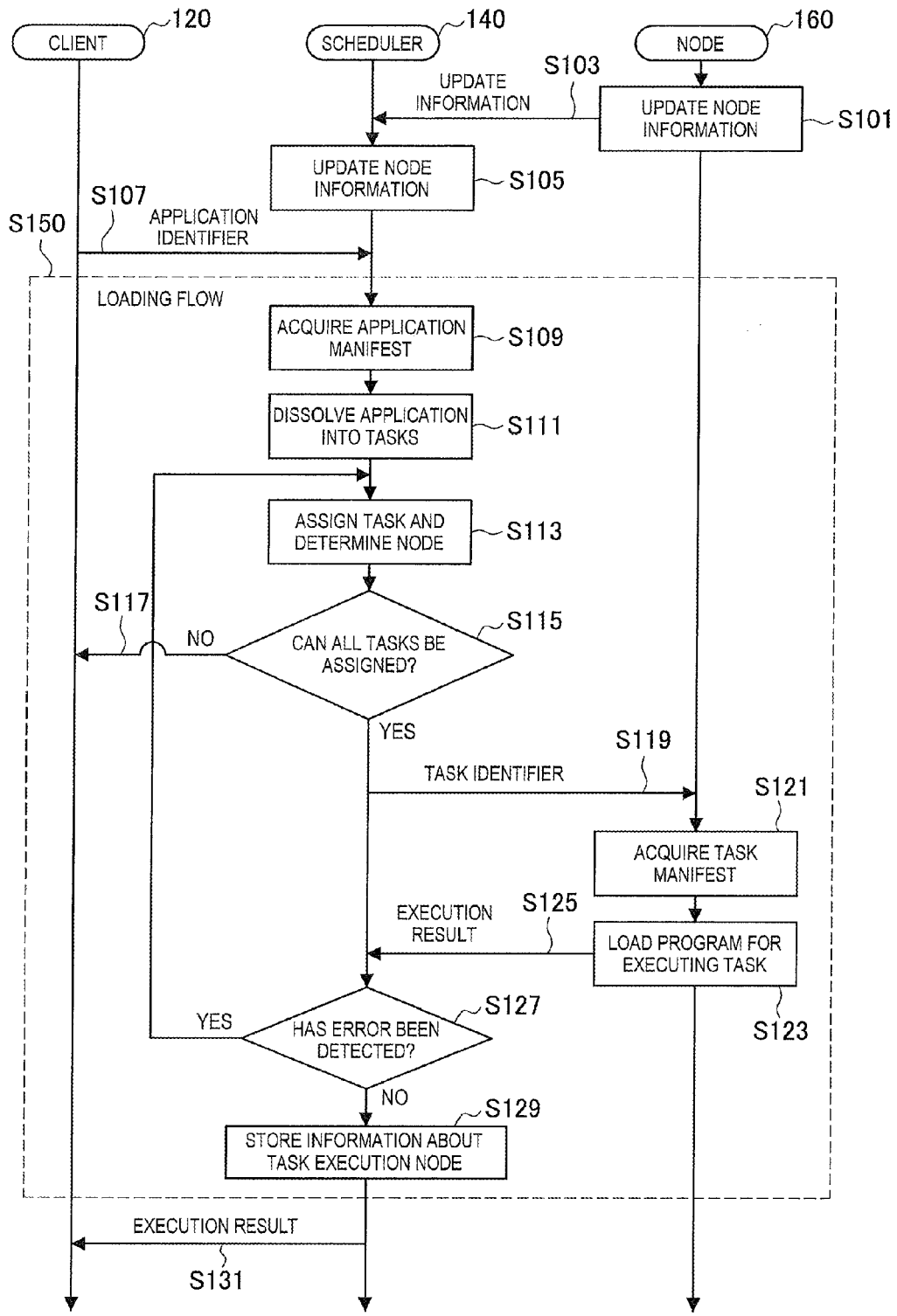
FIG. 3 is a view illustrating a loading processing sequence according to the embodiment of the present disclosure.

FIG. 3 is a view illustrating a loading processing sequence according to the embodiment of the present disclosure. FIG. 3 illustrates a processing sequence between the client 120, the scheduler 140 and the node 160 when the client 120 transmits an application loading request.

Steps S101 to S105 are not necessarily relevant to the application loading request from the client 120, and a processing sequence executed between the scheduler 140 and the node 160. As described above, when the state of the information processing apparatus 100 which functions as the node 160 changes, the node 160 updates node information (specification information, presence information, information about a habitual use state and information about holding resources) (step S101). The monitor 164 of the node 160 transmits this update information to the scheduler 140 (step S103). In the scheduler 140, the node manager 146 receives this information, and updates the holding node information (step S105).

In the loading processing sequence, the request transmitter/response receiver 125 of the client 120 first transmits the application loading request to the scheduler 140 (step S107). The application loading request includes at least an application identifier for uniquely identifying a target application. With the scheduler 140, the request receiver/response transmitter 143 receives this request.

Following steps S109 to S129 are sequences which are referred to below as loading flow S150. Meanwhile, the application analyzer 147 of the scheduler 140 first acquires the application manifest for a loading target application which is identified based on the application identifier (step S109). The application manifest is information including at least a program for executing each task of the application, and information about execution environment which is necessary for service provided by the application to meet predetermined service indices (KPI such as high efficiency, a high-speed response to a client, low cost, low power consumption, high availability and high quality). The application manifest may be acquired from a database inside or outside the scheduler 140, or may be transmitted from the client 120 to the scheduler 140 when the application manifest is already known in the client 120.

Next, the application analyzer 147 dissolves the loading target application into tasks based on the application manifest (step S111). The application is a set of tasks, and can be dissolved into one or a plurality of tasks.

Further, the application analyzer 147 determines the node 160 to which the tasks dissolved from the application are assigned, based on the application manifest and node information held by the node manager 146 (step S113). Meanwhile, the application analyzer 147 determines the node 160 to which the tasks are assigned such that service provided by the application meets the predetermined service indices, based on specification information, presence information, information about the habitual use state and information about holding resources of each node 160.

In addition, in processing of the application analyzer 147 in steps S111 and S113, service indices (such as high efficiency, a high-speed response to a client, low cost, low power consumption, high availability and high quality) set by the user may be used.

Further, one task may be assigned to one node 160 or may be assigned to a plurality of nodes 160. When, for example, the application accesses data held in each information processing apparatus 100 included in the information processing system 10 and executes predetermined processing, a task of "executing predetermined processing of holding data" is assigned to each of a plurality of information processing apparatuses 100.

Meanwhile, when a task T is assigned to the node 160, the node 160 loads a program P which is necessary to execute the task T in this loading processing, and the task T is executed using the program P in subsequent task execution processing. That is, at a point of time of this loading processing, the node 160 which executes each task of an application later is determined, and the program for executing the task is loaded to each node 160 in advance. Hence, each task is assigned to the node 160 determined in advance upon execution of the task, and the task is smoothly executed according to the program loaded in advance.

Next, the application analyzer 147 decides in step S113 whether or not the node 160 to which all tasks are assigned is determined, that is, decides whether or not all tasks can be assigned (step S115). Meanwhile, when it is not decided that all tasks can be assigned, for example, when the number of nodes 160 to which tasks are assigned are in short, the application analyzer 147 transmits a response that the number of nodes 160 to which tasks are assigned are in short, to the client 120 through the request receiver/response transmitter 143 (step S117)

The response to be transmitted may, for example, simply indicate that tasks may not be assigned, or urges a user to take an action of enabling task assignment. The action for enabling task assignment is to make the information processing apparatus 100 which is off-line and does not function as the node 160 and to which the task is not assigned, go online and function as the node 160. Further, when it is difficult to assign all tasks to only the information processing apparatus 100 included in the information processing system 10, it may be possible to urge the user to register utilization of a common server, borrow a new information processing apparatus or install a new function to the information processing apparatus 100.

In step S115, when it is decided that all tasks can be assigned, the request transmitter/response receiver 150 transmits the task loading request to the node 160 (step S119). The task loading request includes at least a task identifier for uniquely identifying a target task. With the node 160, the request receiver/response transmitter 163 receives this request.

Next, the task analyzer 167 of the node 160 acquires the task manifest for a loading target task identified based on the task identifier (step S121). The task manifest is information related to the task, and information including at least a program for executing the task. The task manifest may be acquired from the scheduler 140 or from inside or outside of the node 160, or may be transmitted from the client 120 to the node 160 when the task manifest is known by the client 120.

Next, the task analyzer 167 loads the program for executing the task, to the task reader/executing section 169 based on the task manifest (step S123). Then, the request receiver/response transmitter 163 transmits a loading processing result, to the scheduler 140 (step S125).

With the scheduler 140, the request transmitter/response receiver 150 receives the loading processing result. The response analyzer 148 aggregates and checks processing results received as responses from each node 160 to which a task is assigned.

More specifically, the response analyzer 148 decides whether or not an error is detected in one of loading processing results of tasks (step S127). Meanwhile, when it is decided that an error is detected, the response analyzer 148 requests the application analyzer 147 to redetermine the node 160 as to a task for which an error is detected, and executes again processing subsequent to step S113 for this task.

Meanwhile, when it is not decided in step S127 that an error is detected, that is, when all tasks are loaded to one of nodes 160, the node manager 146 stores information about the task loaded to each node 160 (step S129). Subsequently, the node manager 146 acquires information about a use state of the task loaded to each load 160 (such as information as to what task is stored in each node, information about a storage location of a task, the CPU utilization of each task, the memory utilization and the number of times of execution of a task or the number of accesses in unit times) from the task monitor 168, and manages this information. Next, the loading processing results aggregated by the scheduler 140 are transmitted from the request receiver/response transmitter 143 to the client 120 as responses (step S131).

Thus, the loading processing sequence ends. By this means, a task is assigned to each node 160 such that the client 120 executes the application or the task for which execution is requested by the user in collaboration with the node 160, and the program which is necessary for execution is loaded.

In addition, although, with the above example, the loading processing sequence is triggered by a request from the client 120 and executed, the loading processing sequence is executed once and then is adequately executed again based on decision of the scheduler 140. More specifically, when the information processing apparatus 100 which functions as the node 160 to which a task is assigned goes off-line, the node manager 146 assigns the task assigned to this node 160 again (step S113), and requests the application analyzer 147 to make a loading request again (step S119).

Further, when it is detected that a use frequency of a specific task assigned to the given node 160 is high after the task is executed, the node manager 146 replicates a task assigned to this node as a new task and assigns this new task to another node 160 (step S113), and requests the application analyzer 147 to make a loading request (step S119).

By this means, assignment of a task from the scheduler 140 to the node 160 dynamically changes according to the state of each node 160 detected by the node manager 146, and becomes optimal which matches the state of each node 160 on a moment-to-moment basis.

(Task Execution)

Figure 4:
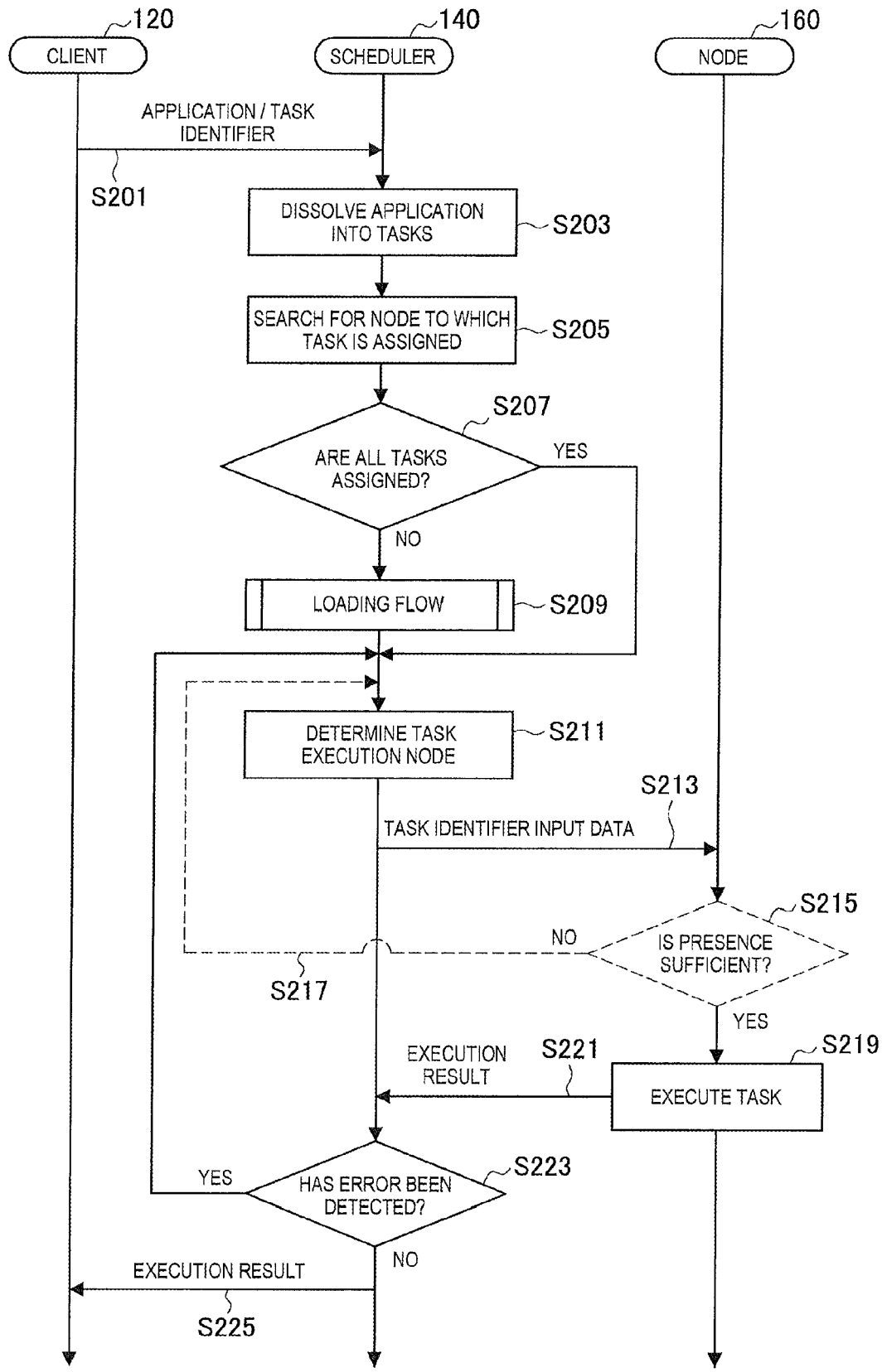
FIG. 4 is a view illustrating a task execution processing sequence according to the embodiment of the present disclosure.

FIG. 4 is a view illustrating a task execution processing sequence according to the embodiment of the present disclosure. FIG. 4 illustrates a processing sequence between the client 120, the scheduler 140 and the node 160 when the client 120 transmits an application or task execution request.

First, the request transmitter/response receiving unit 125 of the client 120 transmits the application or task execution request to the scheduler 140 (step S201). The application or task execution request includes at least an application identifier or a task identifier for uniquely identifying a target application or task. With the scheduler 140, the request receiver/response transmitter 143 receives this request.

Meanwhile, when the application execution request is received, the application analyzer 147 next dissolves the execution target application into tasks (step S203). For the dissolved tasks, task identifiers are also acquired. By this means, even when execution of the application is requested or when execution of the task is requested, it is possible to specify the execution target based on the task identifier. Meanwhile, when the task execution request is received, the same applies except that tasks are dissolved in advance.

Next, the node manager 146 issues a search query using the execution target task identifier, to holding information about the task assigned to each node 160, and searches for the node 160 to which the execution target task is assigned (step S205). Based on the acquired information, the node manager 146 decides to which node 160 all tasks specified based on the execution target task identifier are assigned (step S207). Meanwhile, when it is decided there is a task which is not assigned to any node 160, the node manager 146 requests the application analyzer 147 to execute again loading flow S150 illustrated in FIG. 3 (step S209).

In addition, a case where there is a task which is not assigned to any node 160 refers to, for example, a case where loading flow S150 is not executed in advance, and the execution target task is not assigned to any node 160. Contrary to this, even when loading flow S150 is not executed in advance, if all execution target tasks are assigned to the nodes 160 by accident, above step S209 may not be executed.

Further, an example different from the above case is a case where, while the task is assigned to each node 160 in loading flow S150, the information processing apparatus 100 which functions as the node 160 goes off-line upon execution of the task and immediate execution of the task is requested. When, for example, immediate execution of the task is not requested, and it is predicted based on information about the habitual use state that the information processing apparatus 100 is about to go off-line soon, processing may stand by until the information processing apparatus 100 goes on-line without executing above step S209.

When it is decided that in step S207 that all execution target tasks are assigned to the nodes 160 and after step S209 is executed, the application analyzer 147 determines a task execution node from the nodes 160 to which the tasks are assigned (step S211). Then, the request transmitter/response receiver 150 transmits a task execution request to the node 160 (step S213). The task execution request includes at least a task identifier for uniquely identifying a target task. Further, the task execution request may include input data of the task. With the node 160, the request receiver/response transmitter 163 receives this request.

Meanwhile, when, for example, a task is assigned to one node 160, this node 160 is the task execution node. Further, when, for example, tasks are assigned to a plurality of nodes 160, the task execution node may be a node which can realize the highest service index among these nodes. Furthermore, when, for example, a processing load for executing the task is significant, a plurality of task execution nodes may be set. In this case, the input data of the task is divided and transmitted to each task execution node.

In an additional step, the monitor 164 of the node 160 next decides whether or not presence information (the CPU utilization, the remaining memory, the current line speed, the remaining storage and the remaining battery) of the node 160 shows sufficient presence upon execution of the task (step S215). Meanwhile, when sufficient presence is not shown upon execution of the task due to, for example, worsening of the presence compared to the presence upon assignment of the task, the monitor 164 notifies about the presence to the scheduler 140 through the request receiver/response transmitter 163 (step S217), and the application analyzer 147 of the scheduler 140 redetermines the task execution node (step S211).

When it is decided in step S215 that the sufficient presence is shown upon execution of the task, the task reader/executing section 169 executes the task (step S219). As described above, the task reader/executing section 169 may execute the task utilizing the internal resource 171 through the internal resource interface 170.

When the task to be executed produces an execution result, the request receiver/response transmitter 163 transmits the task execution result to the scheduler 140 as a response after the task reader/executing section 169 executes the task (step S221). The task which produces the execution result is, for example, processing of performing predetermined processing of input data and outputting output data.

In the scheduler 140, the request transmitter/response receiver 150 receives the task execution result. The response analyzer 148 aggregates and checks task execution results received as responses from each node 160 which has executed a task. More specifically, the response analyzer 148 decides whether or not an error is detected in one of task execution results (step S223). Meanwhile, when it is decided that an error is detected, the response analyzer 148 requests the application analyzer 147 to redetermine the task execution node related to a task for which an error is detected (step S211).

When it is not decided in step S223 that an error is detected, the task execution results aggregated by the scheduler 140 are transmitted from the request receiver/response transmitter 143 to the client 120 as responses (step S225).

Thus, the task execution processing sequence ends. By this means, the client 120 executes an application or a task requested by a user, in collaboration with the node 160.

In addition, with the above example, a task execution request which triggers the task execution processing sequence is transmitted to the scheduler 140. However, when the task is executed once and information about the node 160 which executes each task is transmitted to the client 120 according to the execution result, the client 120 may cache this information and transmit the task execution request directly to the node 160 upon next execution of the task. In this case, when the task is unloaded from the node 160 or the information processing apparatus 100 which functions as the node 160 goes off-line, and therefore the node 160 does not respond to the task execution request, the client 120 transmits the task execution request to the scheduler 140 again.

Further, when the client 120 acquires an application or task execution request from the user in a state where loading flow S150 illustrated in FIG. 3 is not executed in advance, it may be possible to execute the loading processing sequence illustrated in FIG. 3 instead of the above task execution processing sequence and transmit the loading request of the task to the node 160 (step S119), also transmit input data of the task where necessary and load a program for executing the task to the node 160 (step S123), and execute the task.

(3. Scheduler Management)
(Scheduler Selection)

As described above, with the information processing system 10 according to the embodiment of the present disclosure, a plurality of information processing apparatuses 100 can potentially function as the schedulers 140. From these information processing apparatuses 100, one or a plurality of information processing apparatuses 100 which actually function as the schedulers 140 are selected according to predetermined process.

Upon loading or execution of a task, a load for computation and communication applies to the scheduler 140 to analyze an application specified by the client 120, determine assignment of the task, acquire information from each node 160, and command loading and execution. This load increases when the number of the clients 120 or the number of nodes 160 is greater. When the number of clients 120 is greater, requests for loading or execution of a plurality of tasks are likely to congest, and, when the number of nodes 160 is greater, collection and analysis of information for loading and executing the task becomes complicated.

Hence, to improve the overall system performance related to loading and execution of the task, the information processing apparatus 100 which has as high computation or communication processing capacity as possible preferably functions as the scheduler 140. With the embodiment of the present disclosure, the information processing apparatus 100 which dynamically functions as the scheduler 140 according to a change in the state of the information processing apparatus 100 included in the information processing system 10 is changed according to predetermined process.

For example, from the view point of performance as described above, the information processing apparatus 100 which has high processing capacity and, in addition, which has a long time in a stand-by state and is stably connected to the network 200 by a wire and to which power is stably supplied from a fixed power source like a stationary game machine is suitable for the scheduler 140.

Further, from, for example, the view point of communication, when the network 200 includes, for example, Internet and communication between the information processing apparatuses 100 causes a problem of delay, the information processing apparatus 100 which causes a shorter delay time to access each information processing apparatus 100 which can function as the client 120 or the node 160 is suitable for the scheduler 140.

In addition, when only an information processing apparatus $100y$ which can communicate only with a specific information processing apparatus $100x$ by way of Near Field Communication such as Bluetooth (registered trademark) is included in the system, the information processing apparatus $100x$ which can directly communicate with the information processing apparatus $100y$ may be selected as the scheduler 140. Meanwhile, in this case, if another information processing apparatus 100 can communicate with the information processing apparatus $100y$ through the information processing apparatus $100x$, the other information processing apparatus 100 may be selected as the scheduler 140, and the information processing apparatus $100x$ may relay communication from the scheduler 140 to the information processing apparatus $100y$ which functions as the node 160.

By the way, although processing capacity of the information processing apparatus 100 mentioned above is statically shown as specification information (such as the CPU processing capacity, the memory capacity, the maximum line speed, the storage capacity and the battery capacity), the processing capacity dynamically changes as actually shown as presence information.

For example, although the above stationary game machine spends a lot of times in a stand-by state and the presence information shows processing capacity similar to the specification information, once the user starts playing a game, a great amount of resources is consumed to execute the game, and therefore the processing capacity shown by the presence information is remaining resources, that is, the processing capacity substantially decreases compared to the specification information in some cases.

In this case, with the embodiment of the present disclosure, the function of the scheduler 140 is transferred to another information processing apparatus 100 from a game machine in order to maintain performance for executing the game which is the original function of the game machine and also maintain performance of the function of the scheduler 140 in a system. Change process executed in this case will be described below.

(Scheduler Change Process)

Figure 5:
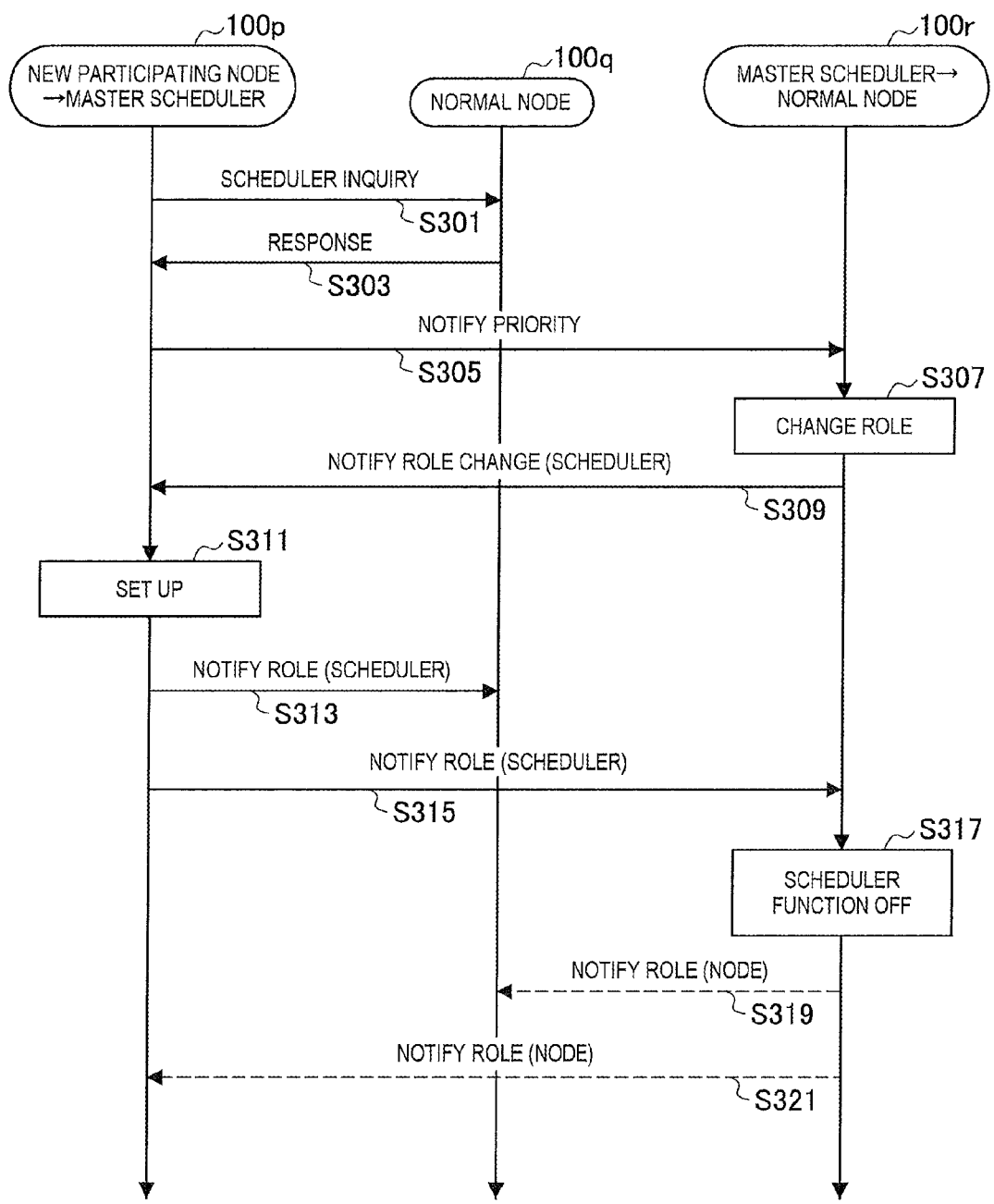
FIG. 5 is a view illustrating change process of a scheduler according to the embodiment of the present disclosure.

FIG. 5 is a view illustrating change process of a scheduler according to the embodiment of the present disclosure. FIG. 5 illustrates a processing sequence between an information processing apparatus $100r$ which has functioned as the scheduler 140 so far and an information processing apparatus $100q$ which is functioning as another normal node 160 when a new information processing apparatus $100p$ newly participates the information processing system 10 and functions as the new scheduler 140.

When added to the system, the information processing apparatus $100p$ transmits a scheduler inquiry to the arbitrary information processing apparatus $100q$ which has participated the system and can perform communication (step S301). This inquiry is directed to inquiring which information processing apparatus 100 in the system functions as the scheduler 140. The information processing apparatus $100q$ which has received the inquiry returns a response showing that the information processing apparatus $100r$ functions as the scheduler 140, to the information processing apparatus $100p$ (step S303).

Next, the information processing apparatus $100p$ notifies the priority of the scheduler 140 of the information processing apparatus $100p$, to the information processing apparatus $100r$ which functions as the scheduler 140 at this point of time (step S305). Meanwhile, the priority of the scheduler 140 is information showing to what degree each information processing apparatus 100 is suitable for the scheduler 140 as a result of taking into account the performance aspect and the communication aspect as described above.

Next, the information processing apparatus $100r$ which functions as the scheduler 140 at this point of time analyzes the priorities of the respective information processing apparatuses 100 including the information processing apparatus $100p$. More specifically, the received priority of the information processing apparatus $100p$ is compared with the held priorities of the other information processing apparatuses 100. With the illustrated example, the priority of the information processing apparatus $100p$ is higher than the priorities of the other information processing apparatuses 100 including the information processing apparatus $100r$. In such a case, the information processing apparatus $100r$ which functions as the scheduler 140 determines a role change for selecting the information processing apparatus $100p$ as the new scheduler 140 (step S307).

Meanwhile, some specific examples of the priority of the scheduler 140 will be described. For example, the priority is an index value calculated based on presence information of each information processing apparatus 100. In this case, the information processing apparatus 100 which has the highest processing capacity at the point of time when analysis is performed is selected as the scheduler 140.

Further, the priority may be an index value calculated by taking into account a predicted value of future processing capacity based on information about the habitual use state in addition to presence information of the information processing apparatus 100. In this case, the information processing apparatus 100 which has high processing capacity to some degree at the point of time when analysis is performed, and is likely to maintain processing capacity for a certain period of time after analysis is performed is selected as a scheduler. When, for example, a user plays a game using a game machine from a specific time every day, a low priority of the game machine is calculated low immediately before this specific time. Consequently, it is possible to eliminate the necessity for immediately selecting the scheduler 140 again due to a change in the use situation after the scheduler 140 is selected once.

Further, the priority may be an index value calculated taking into account the communication state of the information processing apparatus 100. Meanwhile, the communication state refers to, for example, a delay time produced upon accessing another information processing apparatus 100 which functions as the client 120 or the node 160 when the information processing apparatus 100 is selected as the scheduler as described above, and special communication environment as in Near Field Communication.

Next, the information processing apparatus 100r which determines the role change transmits a role change notification to the information processing apparatus 100 which is a target of the role change, that is, the information processing apparatus 100p (step S309). The role change notification transmitted to the information processing apparatus 100p includes information showing that the information processing apparatus 100p should newly function as the scheduler 140. The information processing apparatus 100p which has received the role change notification executes a setup for functioning as the scheduler 140 (step S311).

Meanwhile, the setup for making the information processing apparatus 100 function as the scheduler 140 may be directed to implementing the function of the scheduler 140 by, for example, changing the setting of the middleware commonly installed in the information processing apparatuses 100. Further, the middlewares installed in the information processing apparatuses 100 may vary between the client 120, the scheduler 140 and the node 160. In this case, the information processing apparatus 100p may execute the setup for newly functioning as the scheduler 140 by, for example, downloading and installing the middleware from the information processing apparatus 100r which has functioned as the scheduler 140 so far.

The information processing apparatus 100p which has finished the setup for functioning as the scheduler 140 transmits the role notification to the other information processing apparatuses 100 in the system (steps S313 and S315). The role notification transmitted from the information processing apparatus 100p includes information showing that the information processing apparatus 100p subsequently functions as the scheduler 140. The information processing apparatus 100q which has received the role change in step S313 updates the held information about the information processing apparatus 100 which functions as the scheduler 140, and recognizes that the information processing apparatus 100p functions as the scheduler 140 subsequently.

Meanwhile, the information processing apparatus 100r which has received the role notification in step S315 checks that another information processing apparatus 100 starts functioning as the scheduler 140, and turns off the function of the scheduler 140 (step S317). With the illustrated example, the information processing apparatus 100r participates the system as the node 160 subsequently. Meanwhile, the information processing apparatus 100r may transmit the role notification including information showing that the information processing apparatus 100r functions as the node 160 (and the client 120) subsequently, to the other information processing apparatuses 100 in the system (steps S319 and S321). The information processing apparatuses 100p and 100q may recognize the information processing apparatus 100r as a node based on this role notification.

In addition, when the role notification in steps S319 and S321 is not transmitted, the information processing apparatus 100p may automatically recognize the information processing apparatus 100r as the node 160 when the information processing apparatus 100p is set up as the scheduler. Further, in this case, the information processing apparatus 100q may automatically recognize the information processing apparatus 100r as the node 160 at a point of time when receiving the role notification in step S313 showing that the information processing apparatus 100p newly functions as the scheduler 140.

Thus, the scheduler change process ends. In addition, although process is executed with the illustrated example when the information processing apparatus 100p is newly added to the system, cases where the process is executed are by no means limited to this. When, for example, presence information about the information processing apparatus 100 which has participated the system and therefore the priority of the scheduler 140 changes, the above process is executed. Further, the above process is executed on a regular basis according to the command from the scheduler 140 at this point of time.

In these cases, which information processing apparatus 100 is functioning as the scheduler 140 is known, so that process in steps S301 and S303 are skipped. Further, when the above process is executed on a regular basis, a priority notification of the information processing apparatus 100p (step S305) and a priority notification of the information processing apparatus 100q are also executed.

With the above example, as a result of analyzing the priority of the scheduler 140 of each information processing apparatus 100, there is no appropriate information processing apparatus 100 which functions as the scheduler 140. This is, for example, a case where the information processing which has processing capacity of functioning as the scheduler 140 is not included in the system (no information processing apparatus 100 has a satisfying specification), or a case where every information processing apparatus 100 is used by users and there is no extra information processing apparatus 100 (no information processing apparatus 100 has a sufficient presence).

In this case, at this point of time, the scheduler 140 may make the new information processing apparatus 100 which has sufficient processing capacity participate the information processing system 10, and transfer the function of the scheduler 140 to this information processing apparatus 100. More specifically, when, for example, there is on the network 200 a server which can be used by the user and is not currently used, the scheduler 140 makes this server participate the information processing system 10 and transfers the function of the scheduler 140.

In addition, although each information processing apparatus 100 calculates and notifies the priority of the scheduler 140 of the information processing apparatus 100 with the above example, there are also cases other than this case. The scheduler 140 manages information about each node 160 in the node manager 146, and therefore may be configured to calculate and compare the priority of the scheduler 140 without receiving the notification as to the node 160.

Further, although the scheduler 140 which is already set selects the new scheduler 140 with the above example, there are also cases other than this case. For example, immediately after use of the system starts or when the scheduler 140 goes off-line and, therefore, there is no scheduler 140, the scheduler 140 may be determined by way of mutual selection by exchanging information about the priority between the respective information processing apparatuses 100.

Further, although one information processing apparatus 100 functions as the scheduler 140 with the above example, there are also cases other than this case. As describe below, there can be a plurality of schedulers 140 in the information processing system 10 and, in this case, the information processing apparatuses 100 which function as the schedulers 140 are determined according to the same process as the above change process.

(Case where a Plurality of Schedulers are Set)

Next, a case will be described with the embodiment of the present disclosure where a plurality of schedulers 140 are set. As described above, a significant load applies to the information processing apparatuses 100 which function as the schedulers 140 due to computation and communication. Consequently, although making the information processing apparatus 100 of high processing capacity function as the scheduler 140 is also one option, it is also possible to distribute the function of the scheduler 140 to a plurality of information processing apparatuses 100.

Meanwhile, when a plurality of schedulers 140 manage execution of loading of tasks independently, if, for example, a load of the give node 160 is a little, inconvenience is caused that two schedulers 140 which has acquired this information assign the tasks virtually at the same time and then the load concentrates on the node 160.

Hence, with the embodiment of the present disclosure, a plurality of schedulers 140 manage loading and task execution in collaboration according to a predetermined method. By this means, it is possible to perform optimal scheduling which takes the entire system situation into account, and it is possible to prevent a decrease in a processing efficiency of the scheduler 140 due to acquisition of information from the individual nodes 160, distribution of processing of receiving requests from the individual clients 120 to the schedulers 140 and concentration of the communication amount and the processing load.

Hereinafter, two examples of methods used for collaboration between a plurality of schedulers 140 according to the embodiment of the present disclosure will be described.

(Master Slave Method)

In case of a master slave method, one master scheduler 140$m$ and one or a plurality of slave schedulers 140$s$ are selected as a plurality of schedulers 140. In this case, the scheduler 140 is selected based on, for example, the above priority. More specifically, one of the information processing apparatuses 100 which has the highest priority is selected as the master scheduler 140$m$, and the information processing apparatus 100 which has the second highest priority is selected as the slave scheduler 140$s$. The slave scheduler 140$s$ covers part of the function of the scheduler 140 of the mater scheduler 140$m$.

Meanwhile, the slave scheduler 140$s$ has a limited function of the above schedulers 140. For example, although the slave scheduler 140$s$ does not acquire information directly from the node 160, the function of the node manager 146 is replicated from the master scheduler 140$m$. Further, for example, although the slave scheduler 140$s$ does not rearrange a task assigned to the node 160, the slave scheduler 140$s$ receives an execution request from the client 120.

When the information processing apparatus 100 which functions as the master scheduler 140$m$ goes off-line or a user requests another processing, and therefore a problem occurs in the function of the master scheduler 140$m$, and the slave scheduler 140$s$ is promoted to the master scheduler 140$m$. That is, in this case, the slave scheduler 140$s$ covers the overall function of the master scheduler 140$m$. When there are a plurality of slave schedulers 140$s$, the slave scheduler 140$s$ of a plurality of slave schedulers 140$s$ which has the highest priority is promoted. Meanwhile, one of the information processing apparatuses 100 which is neither the master scheduler 140$m$ nor the slave schedulers 140$s$ and which has the highest priority may be supplemented as the new slave scheduler 140$s$.

In addition, the number of slave schedulers 140$s$ is determined taking into account the number of information processing apparatuses 100 included in the system, the frequency of requests from the clients 120 and availability of the information processing apparatuses which function as the master scheduler 140$m$ and the slave schedulers 140$s$.

Further, although the slave scheduler 140$s$ functions when, for example, information about the node manager 146 is replicated from the master scheduler 140$m$, information is old depending on the frequency of replication, and therefore a problem occurs upon execution of a task. This is, for example, a state where, when a task is executed according to a request from the client 120, there is no node 160 which can execute the task or the task is not loaded to the node 160 to which the task is assigned.

In this case, the slave scheduler 140$s$ supports this state by requesting the master scheduler 140$m$ to replicate again information about the node manager 146, and acquiring the latest information. Further, the slave scheduler 140$s$ may transmit a task identifier of a task to be executed by way of broadcasting, search for the node 160 which can execute the task and assign the task to this node 160.

The scheduler change process illustrated in FIG. 5 is also applied even when a plurality of schedulers 140 are selected according to the master slave method. When, for example, the information processing apparatus 100$p$ which newly participates the system has a higher priority than the information processing apparatus 100$r$ which functions as the master scheduler 140$m$ at a point of this time, the master scheduler 140$m$ first selects the information processing apparatus 100$p$ as the slave scheduler 140$s$ and replicates the function, subsequently transfers the function of the master scheduler 140$m$ and serves as the slave scheduler 140$s$.

Further, although the information processing apparatus 100$p$ has a lower priority than the information processing apparatus 100$r$ which functions as the master scheduler 140$m$ at this point of time, and has a higher priority than the information processing apparatus 100$q$ which functions as the slave scheduler 140$s$, the master scheduler 140$m$ selects the information processing apparatus 100$p$ as the slave scheduler 140$s$. When the number of slave schedulers 140$s$ becomes excessive as a result of this, the master scheduler 140$m$ can stop the function of the slave scheduler 140$s$ of the information processing apparatus 100$q$.

(Distributed Management Method)

In case of the distributed management method, a plurality of schedulers 140 manage different nodes 160, and replicate information about the node 160 to each other. Upon loading, moving, replication and rearrangement of tasks, the respective schedulers 140 notify these task loading, moving replication and rearrangement to the other schedulers 140, and prevent the task from being loaded to the same node 160 at the same time and the load from concentrating on the node 160.

A plurality of schedulers 140 are selected based on various conditions. For example, a plurality of schedulers 140 are selected such that delay upon execution of a task is minimized as much as possible according to the request from the client 120. This is specifically a case where the information processing apparatuses 100 are distributed respectively at a plurality of different locations such as home and a working place, the schedulers 140 are arranged at respective places.

In this case, it is possible to minimize delay upon communication from the information processing apparatuses 100 (which function as the client 120 or the nodes 160) positioned at respective locations to the schedulers 140. Consequently, when tasks which can be executed only by the nodes 160 positioned at respective locations are processed, communication between the respective locations (from home to a working place or vice versa) does not necessarily have to be performed, and delay upon execution of a task becomes short.

Further, a plurality of schedulers 140 may be selected taking into account stability of communication in the network 200. For example, the information processing apparatus 100$x$ connected to the network 200 by way of wireless communication, and the information processing apparatus 100$y$ which can communicate only with the information processing apparatus 100x by way of Near Field Communication such as Bluetooth (registered trademark) are included in the system. In this case, when wireless communication for connecting the information processing apparatus 100x to the network 200 is cut, the information processing apparatus 100x and the information processing apparatus 100y temporarily form a closed network.

In this case, none of the information processing apparatuses 100x and 100y is selected as the scheduler 140, the scheduler 140 is no longer present in the closed network, and therefore one of the information processing apparatuses 100x and 100y is selected as the scheduler 140 when wireless communication is cut. Further, when wireless communication is recovered, the information processing apparatuses 100x and 100y are brought back under control of the previous scheduler 140. That is, the scheduler 140 is likely to frequently change depending on the wireless communication state. To prevent this frequent change, for example, the information processing apparatus 100x which is connected by way of wireless communication of low stability should be selected as the scheduler 140.

(4. Other)

The information processing system 10 according to the embodiment of the present disclosure preferably manages users and the information processing apparatuses 100 based on accounts and sub accounts. Each information processing apparatus 100 authenticates the user based on account information, and prevents use by the third party. Further, when a program for accessing the internal resource 171 is loaded, the information processing apparatus 100 which functions as the node 160 checks whether or not an account using the client 120 which requests loading has an access right to the internal resource 171.

Furthermore, the client 120 presents to the user a list of the nodes 160 to use, information about the internal resource 171 of the node 160 to access, using information such as the application manifest for the application 121. By this means, the user can specify the node 160 which is not used to execute the task (the specific information processing apparatus 100 does not have to be used for some reasons), or specify a service index which the user places a high value on. When, for example, availability is specified as a service index on which the user places a high value, the scheduler 140 which is provided with this information assigns a task for providing the service, to the server on the network which is likely to operate at all times. Further, when the high-speed response is specified as the service index on which the user places a high value, the scheduler 140 which is provided with this information assigns a task to the information processing apparatus 100 having a closer routing distance from the information processing apparatus 100 which functions as the client 120. In addition, the user may, for example, specify the service index which the user places a high value on as described above, using an input device 915 in FIG. 16 described below.

(5. Example of Function to be Implemented)

Hereinafter, a more specific example of a function to be implemented according to the embodiment of the present disclosure will be described.

(Dynamic Reading of Function)

Figure 6:
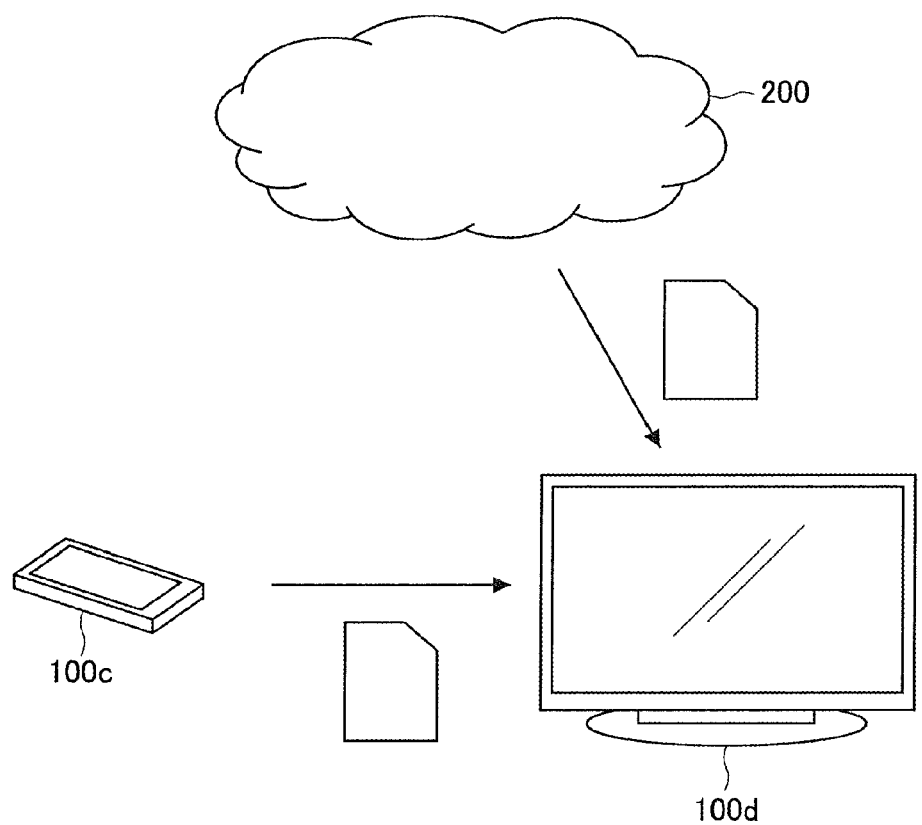
FIG. 6 is a view illustrating an example of dynamic reading of a function according to the embodiment of the present disclosure.

FIG. 6 is a view illustrating an example of dynamic reading of a function according to the embodiment of the present disclosure. With the illustrated example, a television 100d dynamically loads a function from a mobile terminal 100c or the network 200.

With the embodiment of the present disclosure, even when a function which desires to be executed is not held in the information processing apparatus 100, it is possible to load the function from another information processing apparatus 100 or the network 200 and execute the function. The same applies even when the function which desires to be executed is a function for which an execution command is received by the television 100d or is a task for which execution is executed by the mobile terminal 100c which is the client 120 as the node 160 through the scheduler 140.

Consequently, it is possible to minimize the function held in the information processing apparatus 100, and effectively utilize resources in a memory or a storage.

(Resource Borrowing)

Figure 7:
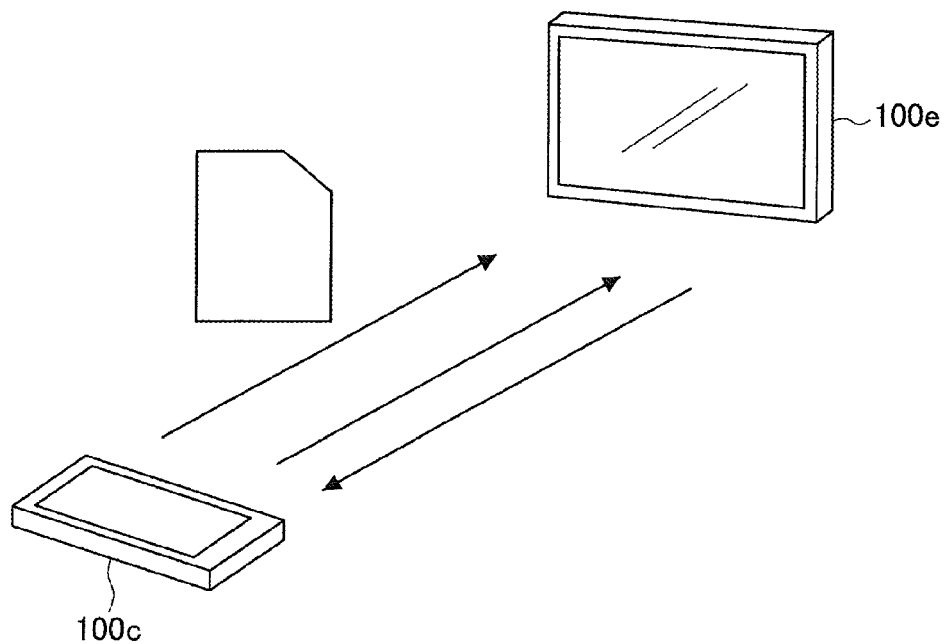
FIG. 7 is a view illustrating an example of borrowing of resources according to the embodiment of the present disclosure.

FIG. 7 is a view illustrating an example of borrowing of resources according to the embodiment of the present disclosure. With the illustrated example, the mobile terminal 100c makes a tablet PC 100e load a task for which execution is requested, and requests the tablet PC 100e to execute the task.

With the embodiment of the present disclosure, the client 120 (mobile terminal 100c) can request the node 160 (tablet PC 100e) to execute the requested task. Meanwhile, the node 160 is the information processing apparatus 100 which has higher processing capacity than the client 120, or which is not temporarily used, that is, which is idling. This request may be executed by making one of the mobile terminal 100c and the tablet PC 100e function as the scheduler 140, or may be executed by making another information processing apparatus 100 further function as the scheduler 140.

By this means, it is possible to save resources of the client 120 (mobile terminal 100c) operated by the user, and accelerate a response to the operation and improve usability.

(Parallel Processing)

Figure 8:
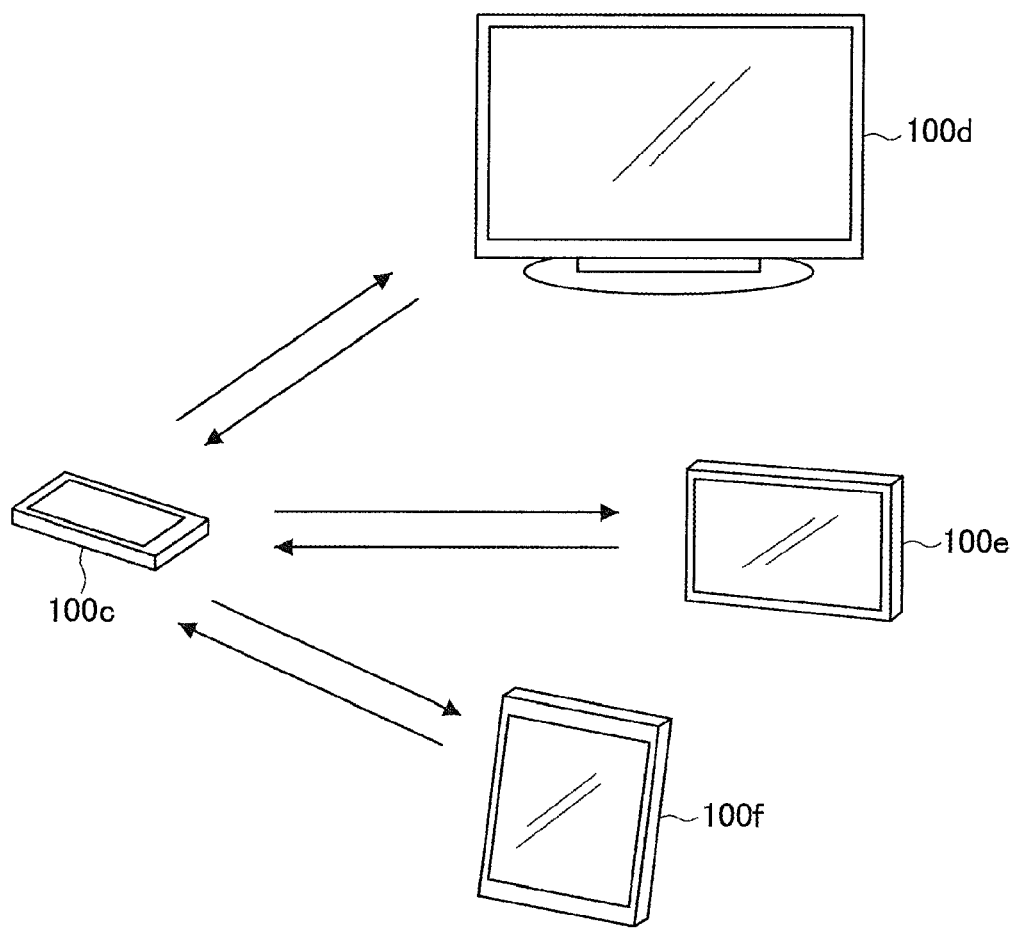
FIG. 8 is a view illustrating an example of parallel processing according to the embodiment of the present disclosure.

FIG. 8 is a view illustrating an example of parallel processing according to the embodiment of the present disclosure. With the illustrated example, the mobile terminal 100c processes a task for which execution is requested by assigning the task to the television 100d and the tablet PCs 100e and 100f.

With the embodiment of the present disclosure, it is possible to assign execution of the task requested by the client 120 (mobile terminal 100c) to a plurality of nodes 160 (the television 100d and the tablet PCs 100e and 100f). Meanwhile, the node 160 may not necessarily have higher processing capacity than the client 120. Further, the client 120 may participate in executing the task as the node 160. This assignment may be executed by making one of the illustrated information processing apparatus 100 function as the scheduler 140 and making another information processing apparatus 100 function as the scheduler 140.

By this means, it is possible to execute a task at a high speed compared to a case where the client 120 (mobile terminal 100c) alone executes the task. Further, it is also possible to smoothly execute comprehensive processing such as processing of searching for information held by each node 160.

(Pipeline Processing)

Figure 9:
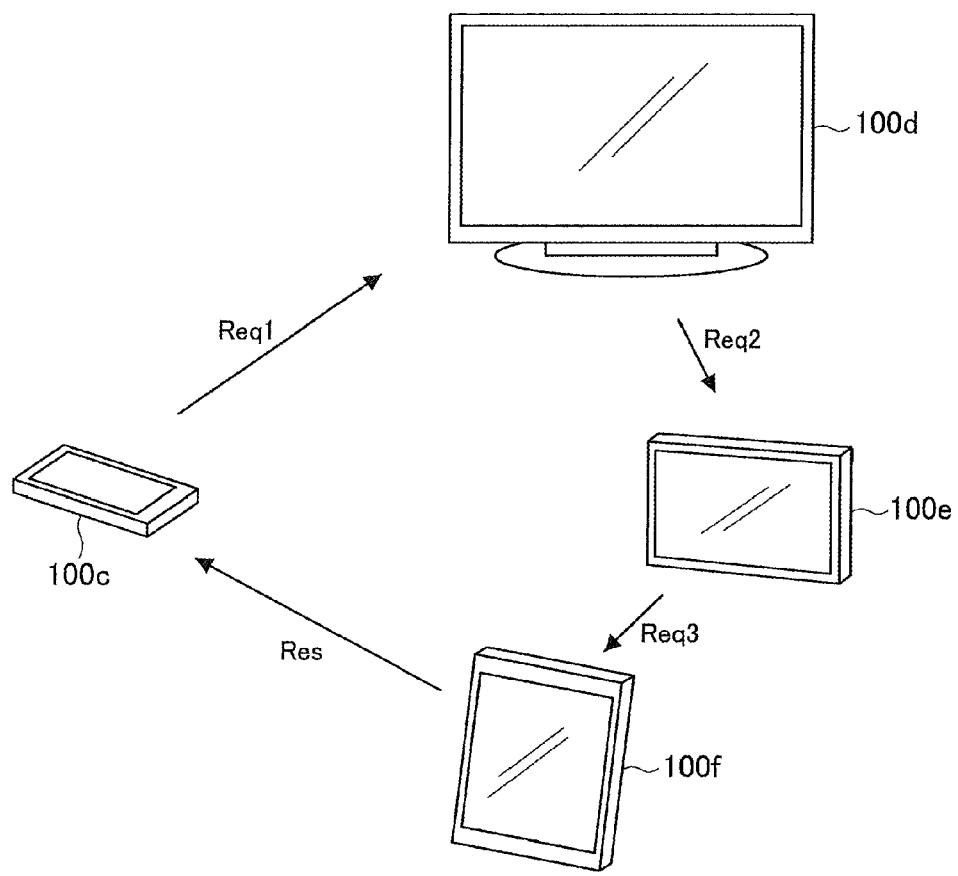
FIG. 9 is a view illustrating an example of pipeline processing according to the embodiment of the present disclosure.

FIG. 9 is a view illustrating an example of pipeline processing according to the embodiment of the present disclosure. With the illustrated example, a task which the mobile terminal 100c is requested to execute is first processed by the television 100d according to a request Req1, is then processed by the tablet PC 100e according to a request Req2, and is further processed by the tablet PC 100f according to a request Req3, and a processing result is returned to the mobile terminal 100c as a response Res.

With the embodiment of the present disclosure, a plurality of nodes 160 (the television 100d and the tablet PCs 100e and 100f) can process in series execution of a task which the client 120 (mobile terminal 100c) is requested to execute. Meanwhile, for example, the task for which execution is requested first utilizes an image processing function of the television 100d, the result is processed utilizing the program of the tablet PC 100e and this result is further processed utilizing another program of the tablet PC 100f. The scheduler 140 assigns execution of the task to a plurality of nodes 160 taking into account capacity of the function of each information processing apparatus 100 or the program.

By this means, it is possible to smoothly and quickly execute the task taking an advantage of a characteristic function of each information processing apparatus 100. Requests and responses of task execution are aggregated by the scheduler 140, so that the client 120 does not have to care for that transmission destinations of requests and transmission sources of responses are different.

(Multi-Device Install)

Figure 10:
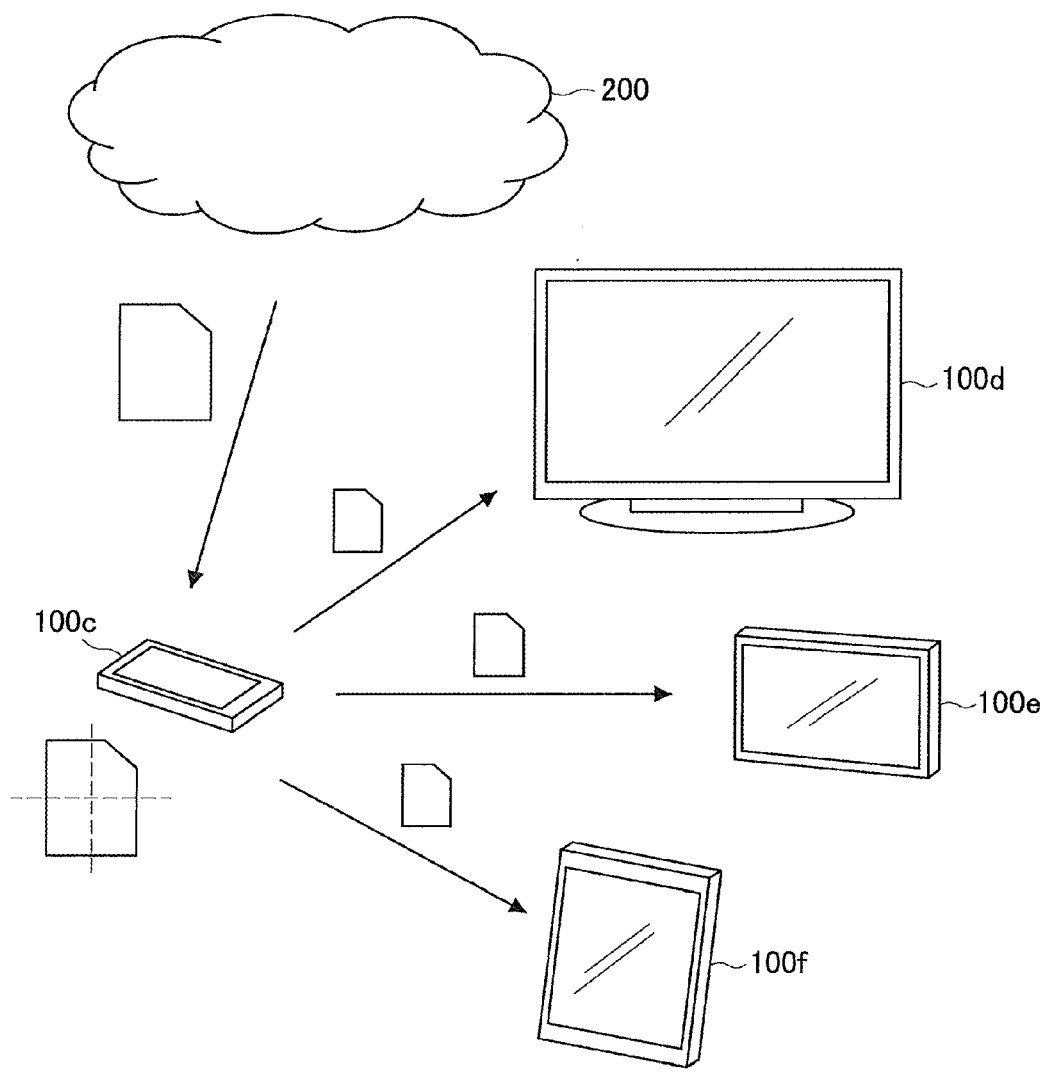
FIG. 10 is a view illustrating an example of multi-device install according to the embodiment of the present disclosure.

FIG. 10 is a view illustrating an example of multi-device install according to the embodiment of the present disclosure. With the illustrated example, the mobile terminal 100c loads an application to execute from the network 200, then divides the application into components and loads the components to the television 100d and the tablet PCs 100e and 100f.

With the embodiment of the present disclosure, the application downloaded by the client 120 (mobile terminal 100c) is thus divided in component units, and loaded to the node 160 (the television 100d and the tablet PCs 100e and 100f). Meanwhile, the scheduler 140 determines which component is loaded to which node 160. In addition, the scheduler 140 may execute downloading of the application.

Consequently, it is possible to automatically execute the application using the optimal information processing apparatus 100. Further, the scheduler 140 divides the application into component units, so that it is possible to provide the application as a single package and easily develop applications.

(Interactive Application)

Figure 11:
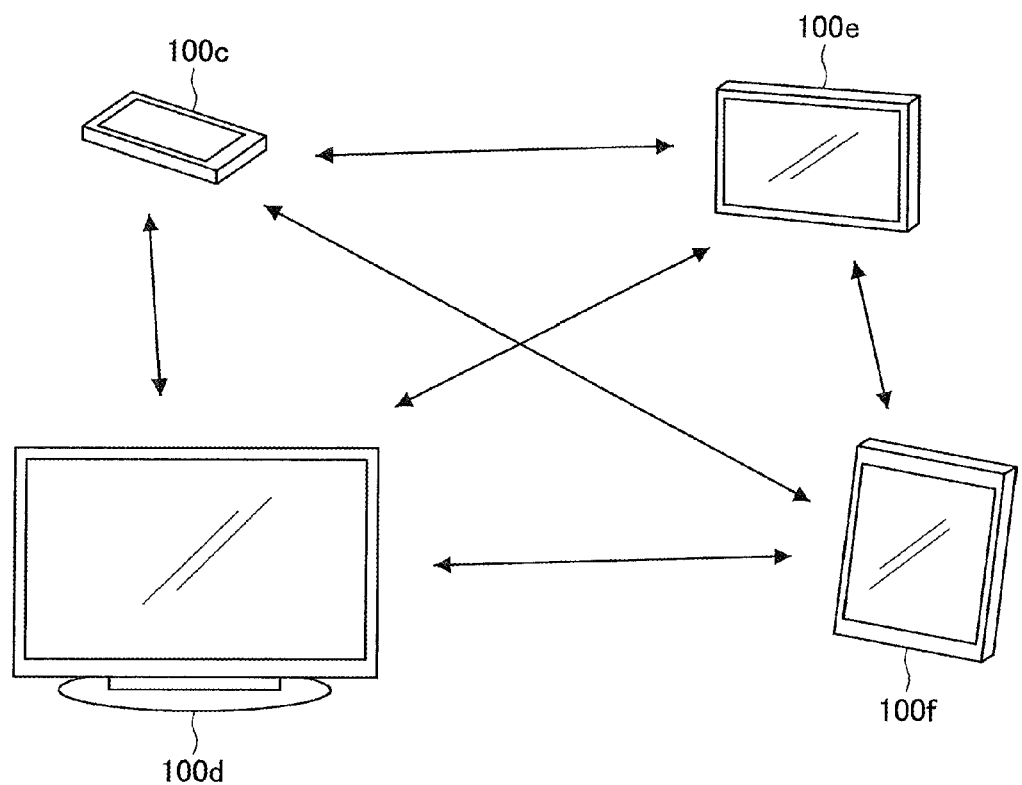
FIG. 11 is a view illustrating an example of an interactive application according to the embodiment of the present disclosure.

FIG. 11 is a view illustrating an example of an interactive application according to the embodiment of the present disclosure. With the illustrated example, components of each application are loaded to the mobile terminal 100c, the television 100d and the tablet PCs 100e and 100f, and are operating as one application while these components are messaging.

With the embodiment of the present disclosure, each information processing apparatus 100 thus functions as both of the client 120 and the node 160. By this means, it is easy to execute one application by interacting the components loaded to a plurality of information processing apparatuses 100.

(Auto-Scaling Deploy)

Figure 12:
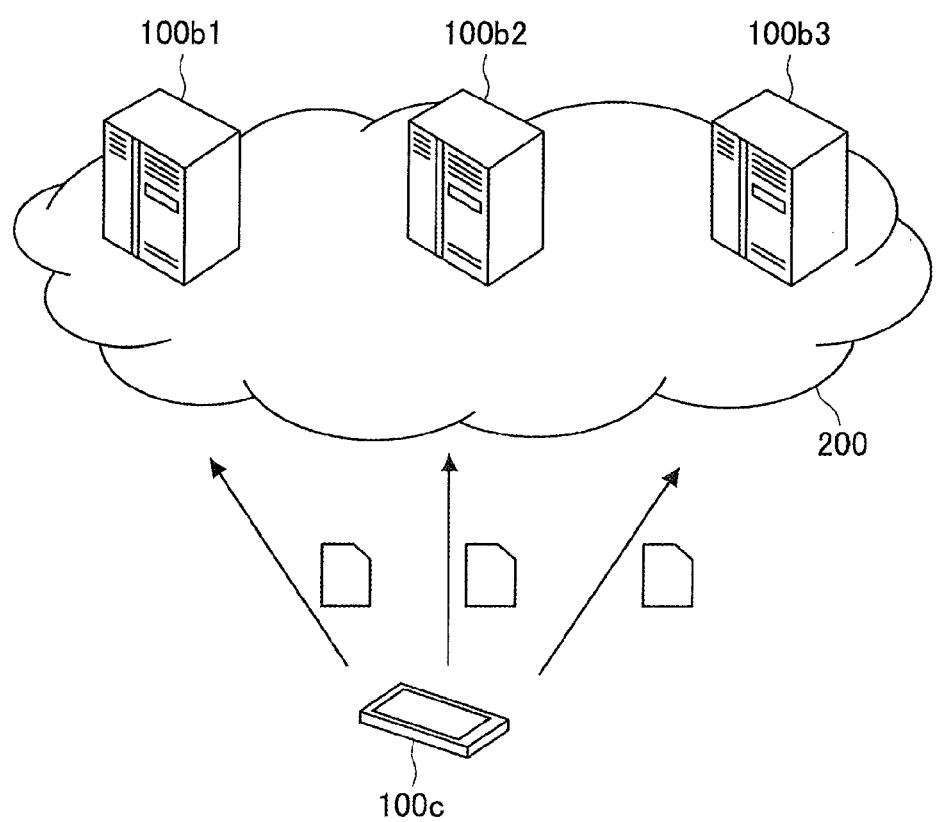
FIG. 12 is a view illustrating an example of auto-scaling deploy according to the embodiment of the present disclosure.

FIG. 12 is a view illustrating an example of auto-scaling deploy according to the embodiment of the present disclosure. With the illustrated example, a task for executing an application activated by the mobile terminal 100c is loaded to servers 100b1 to 100b3 on the network 200.

With the embodiment of the present disclosure, the task of the client 120 (mobile terminal 100c) for executing the application is thus loaded to the appropriate node 160 (servers 100b1 to 100b3) according to a situation. The number and the positions of the nodes 160 to which the task is loaded are set according to the number of accesses from the client 120 and access locations. That is, when the number of accesses from the client 120 is greater, the task may be loaded to a greater number of servers 100b or a task may be loaded to a server 100b at a position closer to an access location of the client 120.

By this means, it is not necessary to take into account a problem of distribution of a load and local delay upon development of an application, so that it is easy to develop applications.

(Failover)

Figure 13:
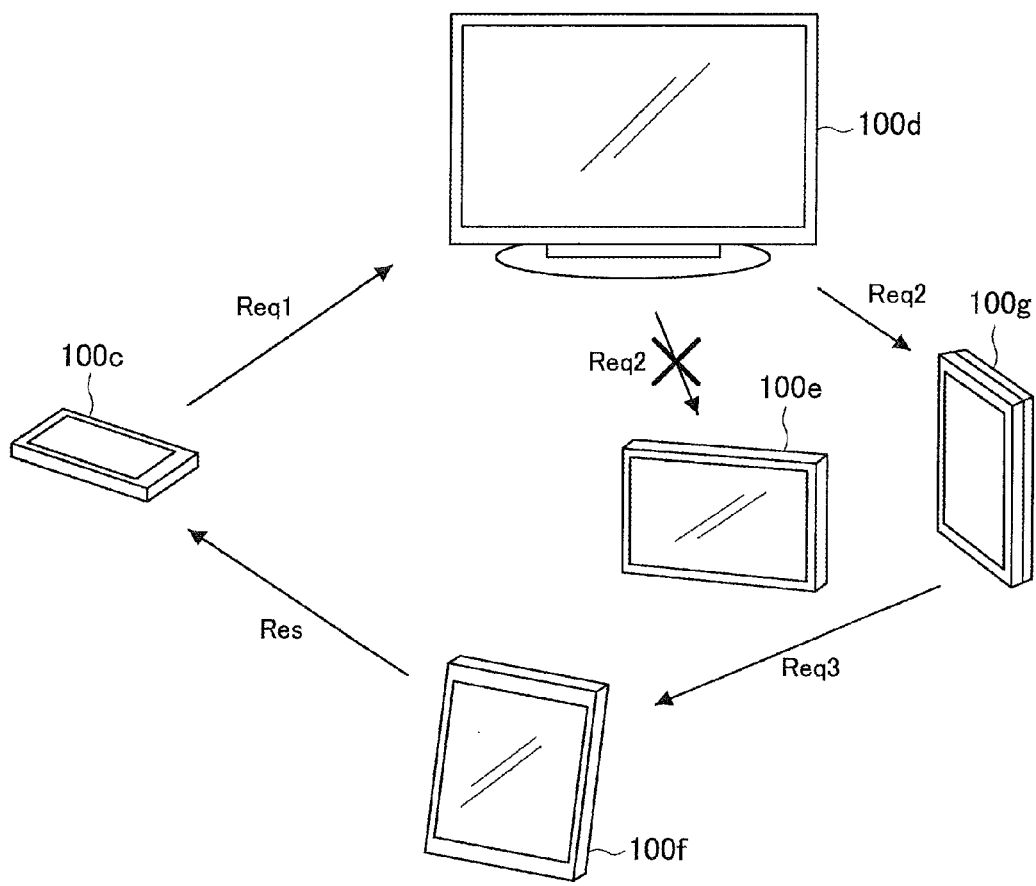
FIG. 13 is a view illustrating an example of failover according to the embodiment of the present disclosure.

FIG. 13 is a view illustrating an example of failover according to the embodiment of the present disclosure. With the illustrated example, in the same pipeline processing as illustrated in FIG. 9, a problem occurs in the tablet PC 100e which receives the request Req2. Then, the new request Req2 is transmitted to another terminal device 100g, and the terminal device 100g transmits the request Req3 to the tablet PC 100f.

With the embodiment of the present disclosure, when a problem occurs in the node 160 which executes a task due to some causes as described above, the scheduler 140 continues processing by switching assignment of a task to another node 160, and returns the response Res to the client 120 as if nothing had happened. By this means, it is possible to execute a task irrespectively of a problem in part of the nodes 160, and improve availability of task execution.

(Auto-Replication & Cache)

Figure 14:
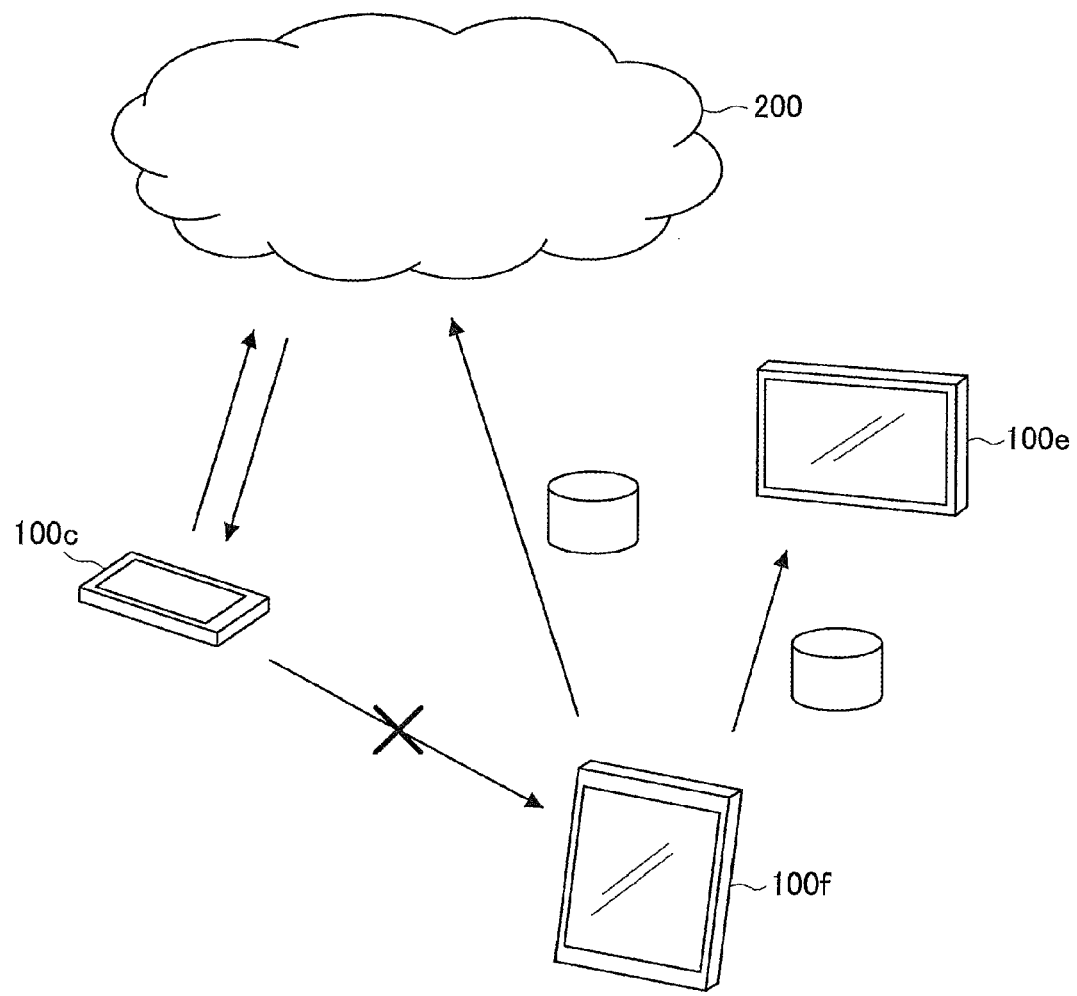
FIG. 14 is a view illustrating examples of auto-replication and a cache according to the embodiment of the present disclosure.

FIG. 14 is a view illustrating examples of auto-replication and a cache according to the embodiment of the present disclosure. With the illustrated example, data transmitted from the mobile terminal 100c to the tablet PC 100f is replicated or cached on another tablet PC 100e or the network 200.

With the embodiment of the present disclosure, when data is exchanged between the information processing apparatuses 100 as described above, data is automatically replicated to another information processing apparatus 100 to avoid an influence of low availability and long delay of communication between devices (because one device goes off-line or the number of times of hopping is great) or data is cached to a server at a position on the network 200 at which shorter delay occurs.

(Automatic Redeploy)

Figure 15:
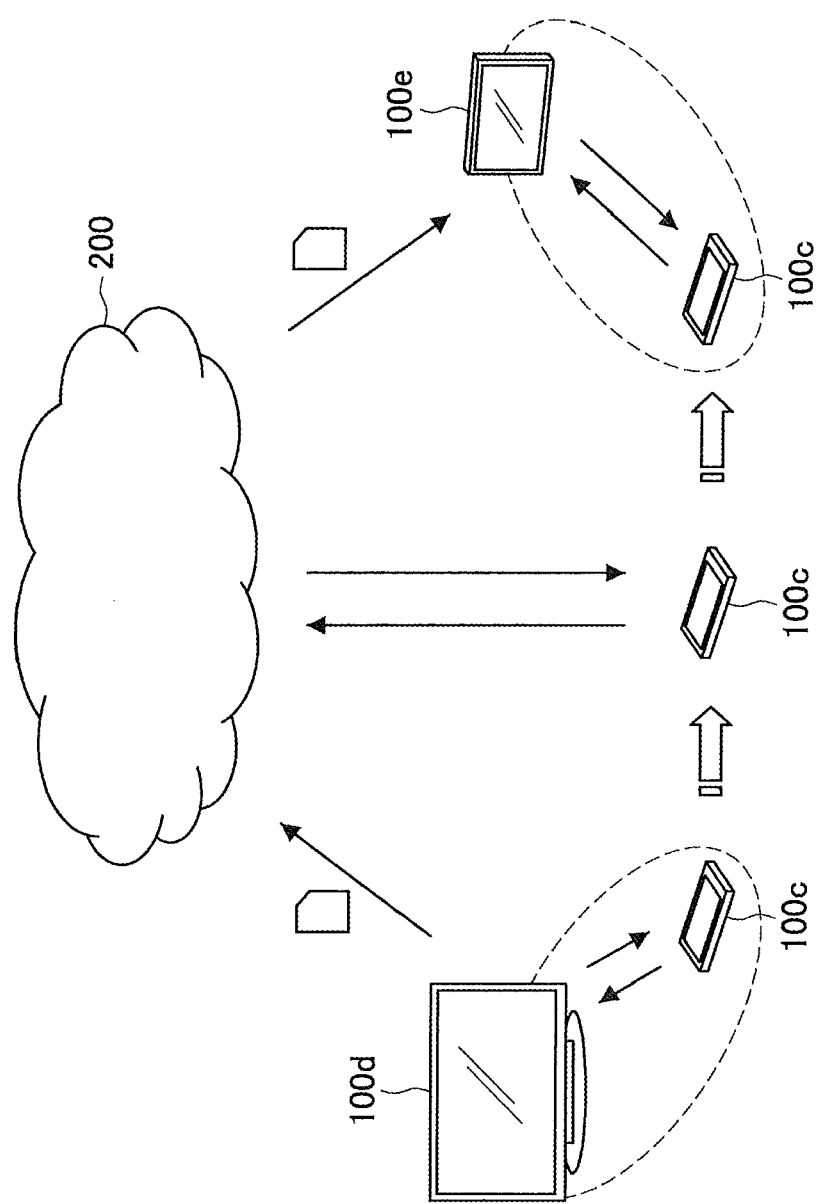
FIG. 15 is a view illustrating an example of automatic redeploy according to the embodiment of the present disclosure.

FIG. 15 is a view illustrating an example of automatic redeploy according to the embodiment of the present disclosure. With the illustrated example, following movement of the mobile terminal 100c which executes a task, a cooperation destination dynamically changes from the television 100d to a server on the network 200 and then to the tablet PC 100e.

With the embodiment of the present disclosure, following a change in a communication situation due to movement of the client 120 (mobile terminal 100c) as described above, the node 160 (the television 100d, the server on the network 200 and the tablet PC 100e) which is the cooperation destination for executing the task changes. A program and data loaded to each node 160 is repeatedly moved, replicated and rearranged following the change in the cooperation destination. The scheduler 140 executes change of a cooperation destination, and movement, replication, and rearrangement of a program and data. In this case, the scheduler 140 selects the node 160 which minimizes delay upon communication with the client 120 as the cooperation destination.

Consequently, it is possible to minimize delay upon execution of a task even when a state such as a physical position of the client 120 changes.

(6. Hardware Configuration)

Hereinafter, a hardware configuration of the information processing apparatus 100 according to the embodiment of the present disclosure described above will be described with reference to FIG. 16. FIG. 16 is a block diagram illustrating the hardware configuration of the information processing apparatus according to the embodiment of the present disclosure. Each configuration of the above information processing apparatus 100 (including a function configuration when the information processing apparatuses function as the client 120, the scheduler 140 and the node 160) is implemented by the hardware configuration described below.

The information processing apparatus 100 includes a CPU 901, a ROM 903 and a RAM 905. Further, the information processing apparatus 100 may have a host bus 907, a bridge 909, an external bus 911, an interface 913, an input device 915, an output device 917, a storage device 919, a drive 921, a connection port 923 and a communication device 925.

The CPU 901 functions as a computation processing device and a control device, controls the entire or part of the operation inside the information processing apparatus 100 according to various programs recorded in the ROM 903, the RAM 905, the storage device 919 or the removable recording medium 927. The ROM 903 stores a program or computation parameters used by the CPU 901. The RAM 905 temporarily stores a program used upon execution of the CPU 901, and parameters which adequately change upon execution of the program. The CPU 901, the ROM 903 and the RAM 905 are mutually connected through the host bus 907 including an internal bus such as a CPU bus. Further, the host bus 907 is connected to the external bus 911 such as a PCI (Peripheral Component Interconnect/Interface) through the bridge 909.

The input device 915 is a device operated by a user such as a mouse, a keyboard, a touch panel, a button, a switch or a lever. The input device 915 may be, for example, a remote controller device which utilizes infrared rays and other radio waves, or may be an external connecting device 929 such as a mobile telephone which matches the operation of the information processing apparatus 100. The input device 915 includes an input control circuit which generates an input signal based on information inputted by the user and outputs the input signal to the CPU 901. The user commands the information processing apparatus 100 to perform a processing operation of inputting various items of data by operating this input device 915.

The output device 917 includes a device which can visually and acoustically notify the acquired information to the user. The output device 917 is, for example, a display device such as a LCD (Liquid Crystal Display), a PDP (Plasma Display Panel), or an organic EL (Electro-Luminescence), an audio output device such as a speaker or a headphone or a printer device. The output device 917 outputs a result obtained by processing by the information processing apparatus 100 as a text or a video image such as an image, or as a sound such as a speech sound or an audio sound.

The storage device 919 is a data storage device which is formed as an example of a memory of the information processing apparatus 100. The storage device 919 includes, for example, a magnetic memory device such as an HDD (Hard Disk Drive), a semiconductor memory device, an optical memory device, or a magneto-optical memory device. This storage device 919 stores programs and various items of data executed by the CPU 901, and various items of data acquired from an outside.

The drive 921 is a reader/writer for the removable recording medium 927 such as a magnetic disk, an optical disk, a magneto-optical disk, or a semiconductor memory, and is built in or provided externally on the information processing apparatus 100. The drive 921 reads information recorded in the attached removable recording medium 927, and outputs the information to the RAM 905. Further, the drive 921 writes the recording in the attached removable recording medium 927.

The connection port 923 is a port for directly connecting a device to the information processing apparatus 100. The connection port 923 is, for example, a USB (Universal Serial Bus) port, an IEEE1394 port or a SCSI (Small Computer System Interface) port. Further, the connection port 923 may be, for example, a RS-232C port, an optical audio terminal or a HDMI (High-Definition Multimedia Interface) port. By connecting the external connection device 929 to the connection port 923, various items of data are exchanged between the information processing apparatus 100 and the external connection device 929.

The communication device 925 is, for example, a communication interface which includes, for example, a communication device for connecting to the communication network 931. The communication device 925 is, for example, a communication card for wired or wireless LAN (Local Area Network), Bluetooth (registered trademark) or WUSB (Wireless USB). Further, the communication device 925 may be, for example, an optical communication router, an ADSL (Asymmetric Digital Subscriber Line) router or a modem for various types of communication. The communication device 925 transmits and receives, for example, signals using a predetermined protocol such as TCP/IP between, for example, Internet and other communication device. Further, the communication network 931 connected to the communication device 925 is a network connected by way of wired connection or wireless connection, and includes, for example, Internet, home LAN, infrared communication, radio wave communication or satellite communication.

An example of the hardware configuration of the information processing apparatus 100 has been described above. Each of the above components may be formed using a commercially available member, or may be formed by hardware specialized in a function of each component. This configuration is adequately changed according to a technical level to be implemented on a moment-to-moment basis.

(7. Supplement)

The configuration, and the function and the effect according to the embodiment of the present disclosure will be summarized.

According to the above-described embodiment of the present disclosure, there is provided an information processing apparatus which has: a receiver configured to receive a request to perform processing related to a task, from a first information processing apparatus which functions as a client on a network; a scheduler configured to, when a rank of a priority of the scheduler of the information processing apparatus among information processing apparatuses on the network is a first predetermined rank or higher, assign the task to one or a plurality of second information processing apparatuses which function as nodes on the network; and a transmitter configured to transmit a request to execute processing related to the task assigned to the one or the plurality of second information processing apparatuses.

According to this configuration, an information processing apparatus which is suitable for a scheduler among information processing apparatuses which can function as schedulers selectively functions as a scheduler. The information processing apparatus which is suitable for a scheduler is, for example, an information processing apparatus which has high capacity of communication or computation executed by a scheduler. Such an information processing apparatus is selected as a scheduler, so that a processing time spent for scheduling or communication becomes a little, and performance of the entire system upon execution of a task improves. In addition, the first predetermined rank is a rank matching the number of schedulers to be selected such as 1 when, for example, only one scheduler is selected or 3 when three schedulers are selected in total as a master scheduler and slave schedulers. Further, processing related to the task is, for example, loading and execution of the task.

The scheduler may stop functioning when the rank of the priority of the scheduler of the information processing apparatus is lower than the first predetermined rank.

According to this configuration, an information processing apparatus which does not function as a scheduler among information processing apparatuses which can function as schedulers stop functioning as the scheduler. Consequently, these information processing apparatuses can also function as, for example, clients and nodes in a system. Further, when an information processing system which temporarily stops functioning and can potentially function as a scheduler is present on the system, even if the scheduler goes off-line or performance of the scheduler decreases due to another processing requested additionally requested by a user decreases, it is possible to easily utilize an alternate scheduler.

When the rank of the priority of the scheduler of the information processing apparatus is the first predetermined rank or higher and is lower than a second predetermined rank, the scheduler may cover part of the function of the scheduler of another information processing apparatus which includes the second predetermined rank or higher as the rank of the priority of the scheduler and which is on the network.

According to this configuration, information processing apparatuses which function as schedulers are classified as an upper scheduler (master scheduler) and sub schedulers (slave schedulers), and the slave schedulers cover part of the function of the master scheduler. By this means, by utilizing an information processing apparatus which is more suitable for a scheduler as a master scheduler which is in charge of main processing of the scheduler and covering part of this function using the slave scheduler, it is possible to further improve performance of the master scheduler. In addition, the second predetermined rank is a rank higher than the first predetermined rank, and is a rank matching the number of master schedulers to be selected such as 1 when, for example, only one master scheduler is selected or 3 when three master schedulers are selected (when the distributed management method and the master slave method are combined).

When a problem occurs in a function of the scheduler of the other information processing apparatus, the scheduler may cover an overall function of the scheduler.

According to this configuration, even when the master scheduler goes off-line or performance of the scheduler decreases due to another processing additionally requested by a user, it is possible to prevent the function of the scheduler from decreasing by promoting the slave scheduler to the master scheduler. When the master scheduler and the slave scheduler are selected in advance, an alternative rank upon occurrence of a problem in the master scheduler is clear, so that it is possible to quickly transfer the function of the scheduler.

The priority of the scheduler may be calculated based on current processing capacity of the information processing apparatus.

According to this configuration, an information processing apparatus which can efficiently process acquisition and analysis of information of each node and computation for task assignment and the like is selected as an information processing apparatus which is suitable for a scheduler, so that it is possible to improve performance of the scheduler.

The priority of the scheduler may be calculated based on a predicted value of future processing capacity of the information processing apparatus.

According to such a configuration, it is possible to select a scheduler based on whether or not it is possible to maintain processing capacity after the information processing apparatus is selected as the scheduler, and prevent performance of the scheduler from decreasing due to a predictable change in a state of the information processing apparatus (such as user's habitual use).

The priority of the scheduler may be calculated based on a communication state of the information processing apparatus.

According to such a configuration, an information processing apparatus which can efficiently process communication to clients and nodes and perform communication in a shorter delay time is selected as an information processing apparatus which is suitable for a scheduler, so that it is possible to improve performance of the scheduler.

The scheduler may assign the task according to processing capacity of the one or the plurality of second information processing apparatuses such that the task achieves a predetermined service index upon execution of the task.

According to such a configuration, a task is assigned to a node such that each task targets at achieving a predetermined service index. This predetermined service index refers to KPI such as high efficiency, a high-speed response to a client, low cost, low power consumption, high availability and high quality, and targets at achieving these indices set per task or application, so that it is possible to accurately improve quality which is necessary for a user to execute the task.

The scheduler dynamically may change assignment of the task according to current processing capacity or a predicted value of future processing capacity of the one or the plurality of second information processing apparatuses.

According to such a configuration, a task is assigned based on processing capacity (represented by, for example, presence information) at a current point of time of the information processing apparatus or predicted future processing capacity (represented by, for example, information about a habitual use state) instead of the specification of the information processing apparatus which simply functions as a node. Consequently, it is possible to improve the efficiency of actual task processing.

The receiver may receive the request for the processing related to the task as a request to perform processing related to an application including a plurality of tasks, and the scheduler may divide the application into the tasks.

According to such a configuration, it is possible to divide even a single package of an application itself into tasks (components) upon execution. Consequently, it is easy to develop applications without caring for division of applications in component units upon development of the applications.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing apparatus comprising:
a receiver configured to receive a request to perform processing related to a task, from a first information processing apparatus which functions as a client on a network;
a scheduler configured to, when a rank of a priority of the scheduler of the information processing apparatus among information processing apparatuses on the network is a first predetermined rank or higher, assign the task to one or a plurality of second information processing apparatuses which function as nodes on the network; and a transmitter configured to transmit a request to execute processing related to the task assigned to the one or the plurality of second information processing apparatuses.

(2) The information processing apparatus according to (1),
wherein the scheduler stops functioning when the rank of the priority of the scheduler of the information processing apparatus is lower than the first predetermined rank.

(3) The information processing apparatus according to (1) or (2),
wherein, when the rank of the priority of the scheduler of the information processing apparatus is the first predetermined rank or higher and is lower than a second predetermined rank, the scheduler covers part of a function of a scheduler of another information processing apparatus on the network, the rank of the priority of the scheduler of the other information processing apparatus being the second predetermined rank or higher.

(4) The information processing apparatus according to (3),
wherein, when a problem occurs in a function of the scheduler of the other information processing apparatus, the scheduler covers an overall function of the scheduler.

(5) The information processing apparatus according to any one of (1) to (4),
wherein the priority of the scheduler is calculated based on current processing capacity of the information processing apparatus.

(6) The information processing apparatus according to any one of (1) to (5),
wherein the priority of the scheduler is calculated based on a predicted value of future processing capacity of the information processing apparatus.

(7) The information processing apparatus according to any one of (1) to (6),
wherein the priority of the scheduler is calculated based on a communication state of the information processing apparatus.

(8) The information processing apparatus according to any one of (1) to (7),
wherein the scheduler assigns the task according to processing capacity of the one or the plurality of second information processing apparatuses such that the task achieves a predetermined service index upon execution of the task.

(9) The information processing apparatus according to (8),
wherein the scheduler dynamically changes assignment of the task according to current processing capacity or a predicted value of future processing capacity of the one or the plurality of second information processing apparatuses.

(10) The information processing apparatus according to any one of (1) to (9),
wherein the receiver receives the request to perform the processing related to the task as a request to perform processing related to an application including a plurality of tasks, and
wherein the scheduler divides the application into the tasks.

(11) An information processing method comprising:
receiving a request to perform processing related to a task, from a first information processing apparatus which functions as a client on a network;
when a rank of a priority of the scheduler of the information processing apparatus among information processing apparatuses on the network is a first predetermined rank or higher, assigning the task to one or a plurality of second information processing apparatuses which function as nodes on the network; and
transmitting a request to execute processing related to the task assigned to the one or the plurality of second information processing apparatuses.

(12) A computer-readable recording medium having a program recorded thereon which causes a computer to execute:
a function of receiving a request to perform processing related to a task, from a first information processing apparatus which functions as a client on a network;
a function of, when a rank of a priority of the scheduler of the information processing apparatus among information processing apparatuses on the network is a first predetermined rank or higher, assigning the task to one or a plurality of second information processing apparatuses which function as nodes on the network; and
a function of transmitting a request to execute processing related to the task assigned to the one or the plurality of second information processing apparatuses.

(13) An information processing system comprising a plurality of information processing apparatuses on a network which each include:
a receiver configured to receive a request to perform processing related to a task, from a first information processing apparatus which functions as a client on a network;
a scheduler configured to assign the task to one or a plurality of second information processing apparatuses which function as nodes on the network; and
a transmitter configured to transmit a request to execute processing related to the task assigned to the one or the plurality of second information processing apparatuses,
wherein a function of a scheduler of, among the plurality of information processing apparatuses, an information processing apparatus whose rank of a priority of the scheduler is a first predetermined rank or higher is enabled, and functions of schedulers of the rest of information processing apparatuses are disabled.

(14) The information processing system according to (13),
wherein the rest of information processing apparatuses function as the clients or the nodes.

(15) The information processing system according to (13) or (14),
wherein, among the plurality of information processing apparatuses, an information processing apparatus whose rank of the priority of the scheduler is the first predetermined rank or higher and a second predetermined rank or higher functions as a master scheduler,
wherein, among the plurality of information processing apparatuses, an information processing apparatus whose rank of the priority of the scheduler is the first predetermined rank or higher and is lower than the second predetermined rank functions as a slave scheduler, and
wherein the information processing apparatus which functions as the slave scheduler covers part of the function of the scheduler of the information processing apparatus which functions as the master scheduler.

(16) The information processing system according to (15),
wherein, when a problem occurs in a function of the scheduler of the information processing apparatus which functions as the master scheduler, the information processing apparatus which functions as the slave scheduler functions as the master scheduler instead.

(17) The information processing system according to any one of (13) to (16),
wherein the priority of the scheduler is calculated based on current processing capacity of the information processing apparatus.

(18) The information processing system according to any one of (13) to (17),
wherein the priority of the scheduler is calculated based on a predicted value of future processing capacity of the information processing apparatus.

(19) The information processing system according to any one of (13) to (18),
wherein the priority of the scheduler is calculated based on a communication state of the information processing apparatus.

The present disclosure contains subject matter related to that disclosed in Japanese Priority Patent Application JP 2011-197974 filed in the Japan Patent Office on Sep. 12, 2011, the entire content of which is hereby incorporated by reference.

What is claimed is:

1. An information processing apparatus, having a processor and memory, comprising:
a receiver configured to receive a request to perform processing related to a task, from a first information processing apparatus which functions as a client on a network;
a scheduler configured to, when a rank of a priority of the scheduler of the information processing apparatus among information processing apparatuses on the network is a first predetermined rank or higher, assign the task to one or a plurality of second information processing apparatuses which function as nodes on the network; and
a transmitter configured to transmit a request to execute processing related to the task assigned to the one or the plurality of second information processing apparatuses.

2. The information processing apparatus according to claim 1,
wherein the scheduler stops functioning when the rank of the priority of the scheduler of the information processing apparatus is lower than the first predetermined rank.

3. The information processing apparatus according to claim 1,
wherein, when the rank of the priority of the scheduler of the information processing apparatus is the first predetermined rank or higher and is lower than a second predetermined rank, the scheduler covers part of a function of a scheduler of another information processing apparatus on the network, the rank of the priority of the scheduler of the other information processing apparatus being the second predetermined rank or higher.

4. The information processing apparatus according to claim 3,
wherein, when a problem occurs in a function of the scheduler of the other information processing apparatus, the scheduler covers an overall function of the scheduler.

5. The information processing apparatus according to claim 1,
wherein the priority of the scheduler is calculated based on current processing capacity of the information processing apparatus.

6. The information processing apparatus according to claim 1,
wherein the priority of the scheduler is calculated based on a predicted value of future processing capacity of the information processing apparatus.

7. The information processing apparatus according to claim 1,
wherein the priority of the scheduler is calculated based on a communication state of the information processing apparatus.

8. The information processing apparatus according to claim 1,
wherein the scheduler assigns the task according to processing capacity of the one or the plurality of second information processing apparatuses such that the task achieves a predetermined service index upon execution of the task.

9. The information processing apparatus according to claim 8,
wherein the scheduler dynamically changes assignment of the task according to current processing capacity or a predicted value of future processing capacity of the one or the plurality of second information processing apparatuses.

10. The information processing apparatus according to claim 1,
wherein the receiver receives the request to perform the processing related to the task as a request to perform processing related to an application including a plurality of tasks, and
wherein the scheduler divides the application into the tasks.

11. An information processing method performed by an information processing apparatus having a scheduler, the method comprising:
receiving a request to perform processing related to a task, from a first information processing apparatus which functions as a client on a network;
when a rank of a priority of the scheduler of the information processing apparatus among information processing apparatuses on the network is a first predetermined rank or higher, assigning the task to one or a plurality of second information processing apparatuses which function as nodes on the network; and
transmitting a request to execute processing related to the task assigned to the one of the plurality of second information processing apparatuses.

12. A non-transitory computer-readable recording medium having a program recorded thereon which causes a computer to execute:
a function of receiving a request to perform processing related to a task, from a first information processing apparatus which functions as a client on a network;
a function of, when a rank of a priority of a scheduler of an information processing apparatus among information processing apparatuses on the network is a first predetermined rank or higher, assigning the task to one or a plurality of second information processing apparatuses which function as nodes on the network; and
a function of transmitting a request to execute processing related to the task assigned to the one or the plurality of second information processing apparatuses.

13. An information processing system comprising a plurality of information processing apparatuses on a network, each having a processor and memory, and further comprising:
a receiver configured to receive a request to perform processing related to a task, from a first information processing apparatus which functions as a client on a network;
a scheduler configured to assign the task to one or a plurality of second information processing apparatuses which function as nodes on the network; and
a transmitter configured to transmit a request to execute processing related to the task assigned to the one or the plurality of second information processing apparatuses,
wherein a function of a scheduler of, among the plurality of information processing apparatuses, an information processing apparatus whose rank of a priority of the scheduler is a first predetermined rank or higher is enabled, and functions of schedulers of the rest of information processing apparatuses are disabled.

14. The information processing system according to claim 13,
- wherein the rest of information processing apparatuses function as the clients or the nodes.

15. The information processing system according to claim 13,
- wherein, among the plurality of information processing apparatuses, an information processing apparatus whose rank of the priority of the scheduler is the first predetermined rank or higher and a second predetermined rank or higher functions as a master scheduler,
- wherein, among the plurality of information processing apparatuses, an information processing apparatus whose rank of the priority of the scheduler is the first predetermined rank or higher and is lower than the second predetermined rank functions as a slave scheduler, and
- wherein the information processing apparatus which functions as the slave scheduler covers part of the function of the scheduler of the information processing apparatus which functions as the master scheduler.

16. The information processing system according to claim 15,
- wherein, when a problem occurs in a function of the scheduler of the information processing apparatus which functions as the master scheduler, the information processing apparatus which functions as the slave scheduler functions as the master scheduler instead.

17. The information processing system according to claim 13,
- wherein the priority of the scheduler is calculated based on current processing capacity of the information processing apparatus.

18. The information processing system according to claim 13,
- wherein the priority of the scheduler is calculated based on a predicted value of future processing capacity of the information processing apparatus.

19. The information processing system according to claim 13,
- wherein the priority of the scheduler is calculated based on a communication state of the information processing apparatus.

* * * * *